(12) United States Patent
Kono et al.

(10) Patent No.: US 7,757,608 B2
(45) Date of Patent: Jul. 20, 2010

(54) METHOD AND DEVICE FOR STEERING VEHICLE HAVING NO CONTACT WITH TRACK

(75) Inventors: Hiroyuki Kono, Hiroshima (JP);
Masahiro Yamaguchi, Hiroshima (JP);
Hiroshi Yamashita, Hiroshima (JP);
Masahisa Masukawa, Hiroshima (JP);
Shunji Morhichika, Hiroshima (JP);
Hiroyuki Mochidome, Hiroshima (JP);
Koki Fukuda, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 584 days.

(21) Appl. No.: 10/532,932

(22) PCT Filed: Oct. 30, 2003

(86) PCT No.: PCT/JP03/13953

§ 371 (c)(1),
(2), (4) Date: Mar. 31, 2006

(87) PCT Pub. No.: WO2004/040391

PCT Pub. Date: May 13, 2004

(65) Prior Publication Data

US 2006/0200280 A1    Sep. 7, 2006

(30) Foreign Application Priority Data

Oct. 30, 2002   (JP) .............................. 2002-316559

(51) Int. Cl.
*B61J 3/00*   (2006.01)
(52) U.S. Cl. ................................... 104/88.01

(58) Field of Classification Search ............... 246/125, 246/126, 2 R, 2 E, 2 S; 104/88.01, 88.02; 213/75 R; 180/167–169, 446
See application file for complete search history.

(56) References Cited

U.S. PATENT DOCUMENTS 6,185,492 B1    2/2001   Kagawa et al.

(Continued)

FOREIGN PATENT DOCUMENTS

EP    1 170 195 A2    1/2002

(Continued)

OTHER PUBLICATIONS

K. Ihara., Illustrated Book of Railload Vehicle Mechanism pp. 85-87.

*Primary Examiner*—S. Joseph Morano
*Assistant Examiner*—Robert J McCarry, Jr.
(74) *Attorney, Agent, or Firm*—Birch, Stewart, Kolasch & Birch, LLP

(57) ABSTRACT

A rail non-contact vehicle includes wheels, a vehicle main body supported by the wheels, and a steering control system. The steering control system includes a control section configured to control a steering of the wheels in a non-mechanical manner, and a drive section configured to mechanically drive the steering of the wheels. The control section includes a first detector configured to detect 1-dimensional coordinate data of a target route, a steering angle holding section configured to hold a target steering angle corresponding to the 1-dimensional coordinate data, a second detector configured to detect a current deviation between the target route and a current position of the vehicle main body, and a control steering angle calculating section configured to generate a control steering angle corresponding to the current deviation and the target steering angle.

30 Claims, 15 Drawing Sheets

U.S. PATENT DOCUMENTS

| | | | |
|---|---|---|---|
| 6,237,504 B1 * | 5/2001 | Tanahashi et al. | 104/243 |
| 6,367,577 B2 * | 4/2002 | Murata et al. | 180/446 |
| 6,463,369 B2 * | 10/2002 | Sadano et al. | 701/28 |
| 6,704,641 B2 * | 3/2004 | Tashiro et al. | 701/110 |

FOREIGN PATENT DOCUMENTS

| | | |
|---|---|---|
| FR | 2 766 782 A1 | 2/1999 |
| GB | 2 374 682 A | 10/2002 |
| JP | 61-143817 A | 7/1986 |
| JP | 4-257006 A | 9/1992 |
| JP | 4-372466 A | 12/1992 |
| JP | 9-207792 A | 8/1997 |
| JP | 10-69219 A | 3/1998 |
| JP | 11-73223 A | 3/1999 |
| JP | 2000-85612 A | 3/2000 |
| JP | 2000-264196 A | 9/2000 |
| JP | 2000-302055 A | 10/2000 |
| JP | 2001-10518 A | 1/2001 |
| JP | 2001-10519 A | 1/2001 |
| JP | 2001-301640 A | 10/2001 |
| JP | 2002- 19603 A | 1/2002 |
| JP | 2002-310651 A | 10/2002 |
| JP | 2002-312034 A | 10/2002 |
| JP | 2002-351544 A | 12/2002 |

* cited by examiner

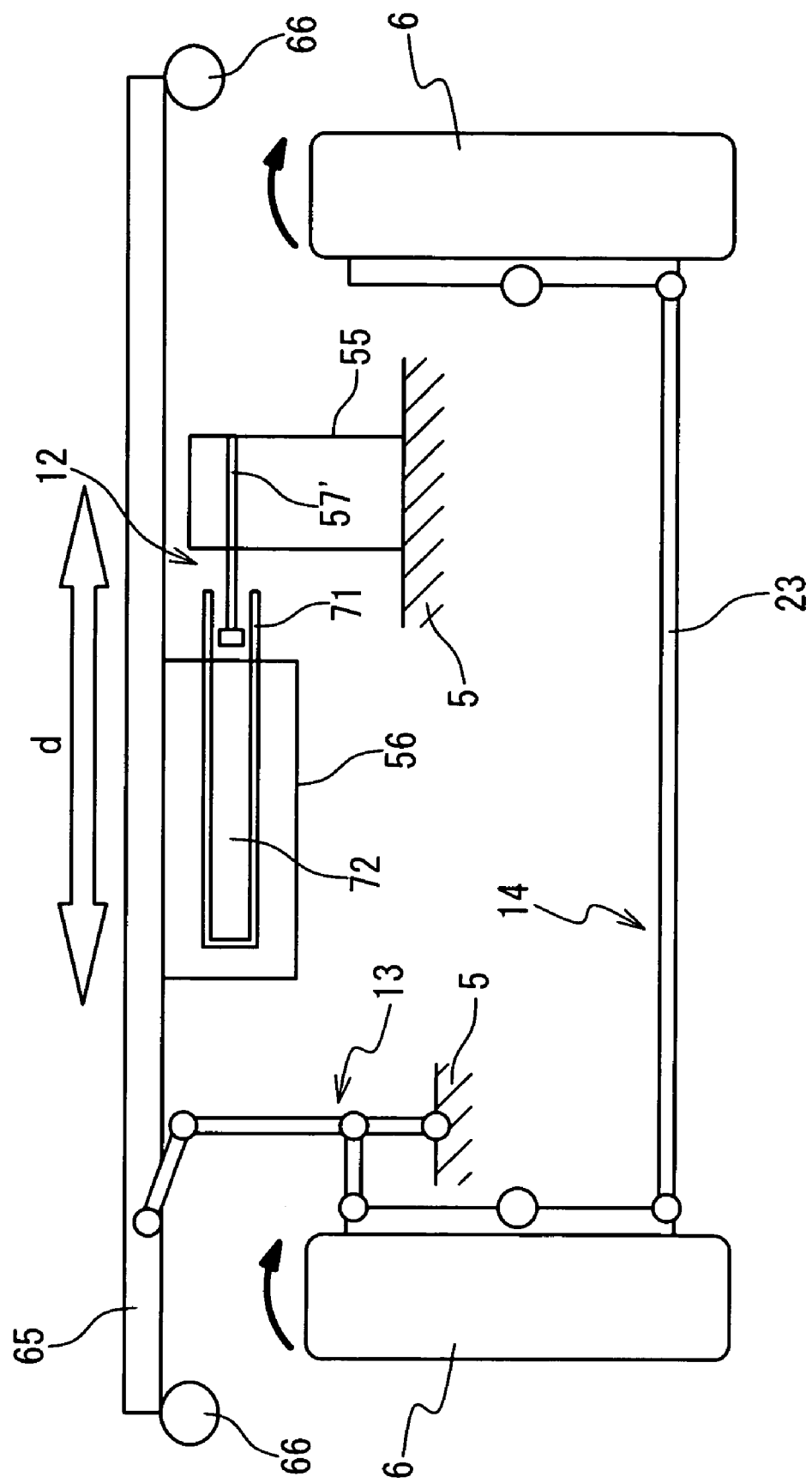

METHOD AND DEVICE FOR STEERING VEHICLE HAVING NO CONTACT WITH TRACK

This application is a 371 of PCT/JP03/13953, filed Oct. 30, 2003, which claims priority under 35 U.S.C. §119(a)-(e) of Japanese Application 2002-316559, filed Oct. 30, 2002.

TECHNICAL FIELD

The present invention relates to a steering apparatus for a rail non-contact vehicle and a steering method for the same, and more particularly to a steering apparatus for a rail non-contact vehicle, in which a steering operation is automated, and a steering method for the same.

BACKGROUND ART

Adoption of a new transportation system is now promoted in narrow areas such as an airport and an exhibition site. Unlike Shinkansen bullet train as wide area transportation technology, the new transportation system is not required to transport in high speed and to carry out mass transportation, but is required not to need a large-scaled rail facility. As a vehicle, which needs no rail facilities, a rubber tire type vehicle such as an automobile and a bus is known in Japanese Patent Laid Open Application (JP-P2002-310651A). The rubber tire type vehicle has a great degree of freedom on a running direction, and is not suitable for a vehicle in an airport. As disclosed in Japanese Patent Laid Open application (JP-P2002-19603A), it is required to the new transportation system that a running route can be readily defined. Various techniques are known for a technology of a simple guide rail. Such guide rail requires a certain degree of strength for the safety operation. Securing the strength hinders desired reduction in facilities cost.

In order to abolish a mechanical guide rail, it is proposed to arrange a road surface side information belt having 1-dimensional coordinate data on a defined route. Such road surface side information belt is written with an operation data. The operation data includes a 1-dimensional coordinate data set on the running route. In this case, a table is necessary to indicate a corresponding relationship between the 1-dimensional coordinate data and an operation control data such as a steering angle, a velocity, and an acceleration. If the table value is fixed, it become difficult to carry out a control corresponding to a run situation that changes from moment to moment. Therefore, conventionally, a rapid velocity change resulted from a rapid change in a steering angle (for example, acceleration in a direction perpendicular to a rail direction) is caused, thereby, leading to aggravation of degree of comfort.

Establishment of the technology of a steering system is required that is free from mechanical steering portion that mechanically contacts a guide rail, and precisely follows a defined run route. It is important not to abolish a safety rail to secure safety; however, simplification of the safety rail is desired. Comfort during an automated operation is also required.

DISCLOSURE OF INVENTION

An object of the present invention is to provide a steering apparatus for a rail non-contact vehicle and a steering method for the same, in which a technology is established of automating steering of the vehicle having no mechanical steering portion that contacts mechanically with a guide rail.

Another object of the present invention is to provide a steering apparatus for a rail non-contact vehicle and a steering method for the same, in which a smooth operation can be accomplished by taking a future (predicted) variable into a control system.

Still another object of the present invention is to provide a steering apparatus for a rail non-contact vehicle and a steering method for the same, in which an optimal control can be carried out through learning.

Also, it is an object of the present invention to provide a steering apparatus for a rail non-contact vehicle and a steering method for the same, in which improvement in automatic control performance can be attained as well as improvement in a degree of comfort.

A rail non-contact vehicle includes wheels, a vehicle main body supported by the wheels, and a steering control system. The steering control system includes a control section configured to control a steering of the wheels in a non-mechanical manner, and a drive section configured to mechanically drive the steering of the wheels. The control section includes a first detector configured to detect 1-dimensional coordinate data of a target route, a steering angle holding section configured to hold a target steering angle corresponding to the 1-dimensional coordinate data, a second detector configured to detect a current deviation between the target route and a current position of the vehicle main body, and a control steering angle calculating section configured to generate a control steering angle corresponding to the current deviation and the target steering angle. The current deviation is defined as a distance to the current position of the vehicle main body in a direction orthogonal to the target route, and the drive section turns an orientation of the wheels based on the control steering angle.

Here, the target route is preferably set on a road surface, and the second detector detects the position deviation in a non-contact manner.

Also, the rail non-contact vehicle may further include a calculating section provided on the vehicle main body. The calculating section calculates and holds a 2-dimensional coordinate data by integrating a velocity data of the vehicle main body.

Also, the target route is set on a road surface and may include an output section configured to output the 1-dimensional coordinate data, and the 1-dimensional coordinate data is transmitted to the first detector in wireless from the output portion. In this case, the target steering angle is preferably written in a running route.

Also, the control section may further include a third detector configured to detect a velocity of the vehicle main body, and the steering angle control section generates a control data corresponding to the position deviation, the desired steering angle, and the velocity.

Also, the control section may further include an optimization calculating section configured to optimize the control steering angle to an optimal solution, and the optimal solution is determined to minimize vibration resulting from the steering of the vehicle.

Also, the control section may further include a steering angle correction controller configured to determine a future steering angle corresponding to a future position on the target route, and to generate a correction steering angle corresponding to the current deviation, the target steering angle, and the future steering angle. The control steering angle calculating section generates the control steering angle corresponding to the current deviation, the target steering angle, and the correction steering angle. In this case, the control section may further include a second detector configured to detect the current steering angle to the current position when the vehicle carries out a N-th run of the target route, and an optimal solution calculating section configured to determine a current optimal target steering angle from all or a part of the current steering angles for N times. The optimal solution calculating section determines the current optimal target steering angle such that vibration resulting from the steering of the vehicle is minimized. Also, the optimal solution calculating section may include a neural network configured to determine the correction steering angle. Instead, the optimal solution calculating section may execute a program to determine the correction steering angle based on genetic algorithm.

Also, the optimal solution calculating section preferably executes a program to determine the correction steering angle based on genetic algorithm.

Also, the control section may further include an optimization calculating section configured to optimize a control data, and the optimization calculating section minimizes vibration resulting from the steering of the vehicle. In this case, when m and n take an optional one of a plurality of combinations of m and n, a deviation between a position of the vehicle main body at an m-th run and an n-th run on the target route is expressed as an amplitude. The optimization calculating section determines the correction steering angle such that a square of the amplitudes is minimized. Also, when m and n take an optional one of a plurality of combinations of m and n, an acceleration of the vehicle main body between the m-th run and the n-th run on the target route is expressed. The optimization calculating section determines the correction steering angle such that squares of the accelerations are minimized.

Also, the rail non-contact vehicle may further include a cart supported by the wheels, and a safety bar supported to the cart and configured to contact a rail side fixed object. The drive section is interposed between the cart and the wheels, and a displacement portion of the drive section is mechanically connected with the wheels and the safety bar. In this case, the displacement portion may be a ball screw driven by a motor or a nut connected to the ball screw. Also, the displacement portion may be a cylinder driven with a fluid pressure source or a piston rod connected to the cylinder.

Also, in a second aspect of the present invention, a rail non-contact vehicle includes wheels, a cart supported by the wheels, and a steering apparatus. The steering apparatus includes a motor, a screw axis connected with an output axis of the motor, bearings configured to support the screw axis, a nut screwed with the screw axis, a first support configured to support the nut, a second support configured to support the bearings, and a link mechanism configured to steer the wheels. Either of the first support and the second support constitutes a fixation side support fixed to the cart, and either of the first support and the second support constitutes a movable side support connected with the link mechanism.

Here, the rail non-contact vehicle may further include a safety bar, and safe rings supported by the safety bar. The safety bar is connected with the movable side support, the cart is connected with the fixation side support, and the nut is supported by the cart. Also, the motor and the bearings are supported by the safety bar.

Also, the steering apparatus may further include a clutch interposed between the screw axis and the motor, and connection of the clutch is released in response to contact of the safe rings and the rail side fixed object.

Also, the nut is supported by the link mechanism, and the motor and the bearings are supported by the cart. Also, the screw axis constitutes a ball screw axis.

In a third aspect of the present invention, a rail non-contact vehicle includes wheels, a cart supported by the wheels, and a steering unit. The steering machine includes a motor, a movable body connected with an output axis of the motor, a safety bar provided with safe rings, and a link mechanism configured to steer the wheels. The link mechanism is connected with the safety bar and the movable body, and the safety bar is movably supported to the cart, and the motor is fixedly supported by the cart.

Here, the output axis of the motor may be connected with a movable body via a pinion and a rack.

In a fourth aspect of the present invention, a rail non-contact vehicle includes wheels, a cart supported by the wheels, and a steering unit. The steering unit includes a motor, a screw axis connected with an output axis of the motor, bearings configured to support the screw axis, a nut screwed in the screw axis, a link mechanism configured to steer the wheels, and a safety bar provided with safe rings. The safety bar, the motor, and the bearings are fixedly supported by the cart, and the nut is connected with the link mechanism.

Also, the steering unit may further include a clutch interposed between the screw axis and the motor, and connection of the clutch is released in response to a contact of the safe rings and the rail side fixed object.

Also, in a fifth aspect of the present invention, a method of steering a rail non-contact vehicle, is achieved by setting of a 1-dimensional coordinate data of a target route; by setting of a target steering angle corresponding to the 1-dimensional coordinate data $X_j$; by detecting a current deviation between the target routes and a current position of a vehicle main body; by generating a control steering angle corresponding to the current deviation and the target steering angle; and by turning orientation of wheels to an angle position corresponding to the control steering angle. The current deviation is defined as a distance of the current position in a direction orthogonal to the target route.

Also, the steering method may be achieved by further setting a future target steering corresponding to a future position on the target route; and by generating a correction steering angle corresponding to the future steering angle. The control steering angle is determined based on the current deviation, the target steering angle, and the correction steering angle.

Also, a sixth aspect of the present invention relates to a steering method of a rail non-contact vehicle, which comprise a drive section may include a motor, a ball screw axis connected with an output axis of the motor, and a nut connected with the ball screw axis, a clutch interposed between the motor and the ball screw axis, and a link mechanism connected with the wheels and configured to operate a rotation of the output axis of the motor. The steering method is achieved by detecting a contact between a part of the vehicle with a road surface side structure; and by disengaging the clutch interposed therebetween in response to the contact.

The steering apparatus for a rail non-contact vehicle and the steering method thereof according to the present invention establishes a technique of automatic operation of a new transportation system, and dramatically improves smooth control performance, and thereby remarkably improves a degree of comfort. The steering apparatus mechanism using the ball screw axis reduces cost, simplifies the mechanism, and dramatically improves smooth control performance.

BRIEF DESCRIPTION OF DRAWINGS

FIG. 22 is a sectional view showing the drive section in the rail non-contact vehicle according to the tenth embodiment of the present invention.

BEST MODE FOR CARRYING OUT THE INVENTION

Hereinafter, a steering apparatus of a rail non-contact vehicle of the present invention will be described in detail with reference to the attached drawings.

Figure 1:
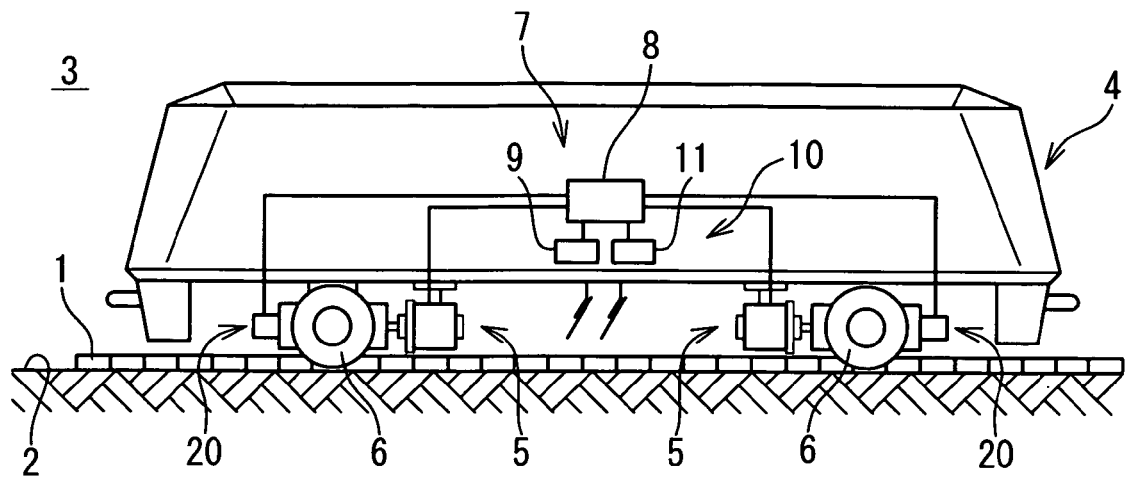
FIG. 1 is a diagram showing a steering apparatus of a rail non-contact vehicle according to a first embodiment of the present invention.

FIG. 1 is a diagram showing the steering apparatus of the rail non-contact vehicle according to the first embodiment of the present invention. Referring to FIG. 1, a guide line 1 is provided on a dedicated rail plane 2 to define a rail reference. The dedicated rail plane 2 is formed linearly or curvedly. The guide line 1 is shown in FIG. 1 such that it projects from the rail plane 2. However, the guide line 1 may be formed to be embedded in the rail plane 2. The vehicle 3 is provided with a vehicle main body 4 and a cart 5. The cart 5 is supported by the dedicated rail plane 2. The vehicle main body 4 is supported on the rail plane 2 by the cart 5 in such a manner that the vehicle main body 4 can turn freely around a perpendicular axis or an axis normal to the rail plane. The cart 5 is provided with wheels 6.

Figure 2:
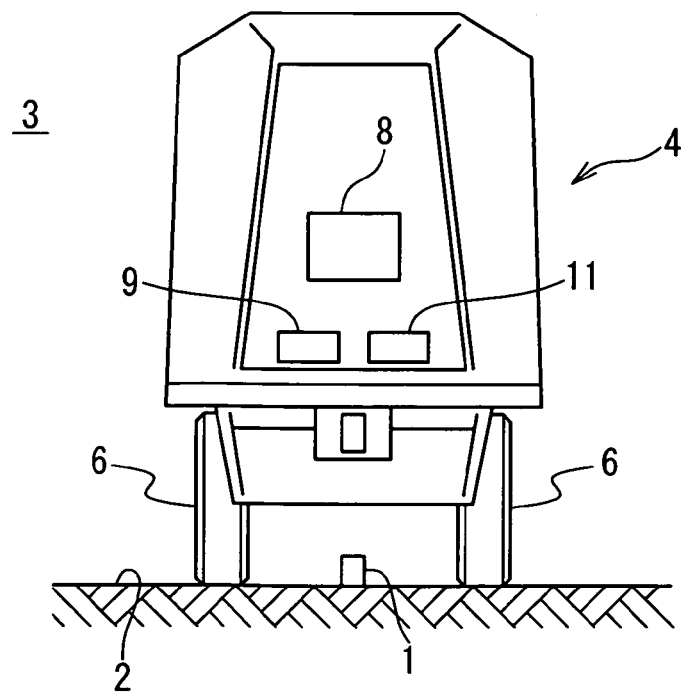
FIG. 2 shows a side sectional view of FIG. 1.

The steering system is provided with a control section 10 as a non-mechanical steering system section, and a drive section 20 as a mechanical steering system section. The steering system is not provided with a mechanical guide rail by which the vehicle 3 is mechanically guided, as shown in FIG. 2. It is not essential that the vehicle 3 mechanically contacts with the guide line 1.

Figure 3:
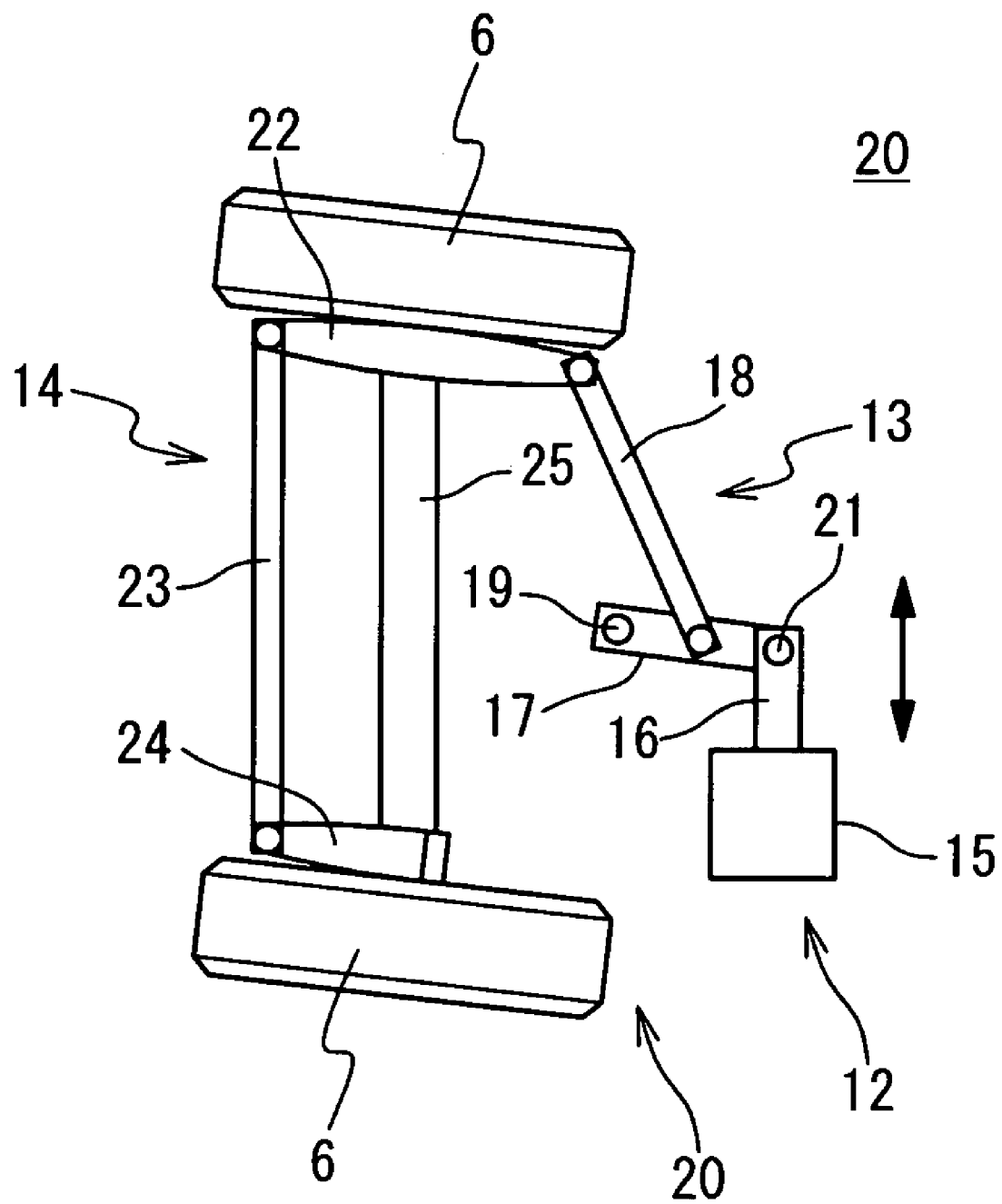
FIG. 3 is a plan view showing a drive section in the steering apparatus of the rail non-contact vehicle according to the first embodiment of the present invention.

FIG. 3 shows a drive section 20. The drive section 20 includes an actuator 12, a first link mechanism 13, and a second link mechanism 14. The actuator 12 has an actuator main body 15 as an unmovable part, and a piston rod 16 as a movable part. The actuator main body 15 is fixed to the cart 5. The first link mechanism 13 is provided with a first link 17 and a second link 18. The base side of the first link 17 is rotatably supported by the cart 5 by a first pin 19. Free end of the first link 17 is rotatably connected with the operation end of the piston rod 16 by a second pin 21. The second link mechanism 14 is provided with a first lever 22 rotatably supported by the cart 5, a lever link 23, and a second lever 24 rotatably supported by the cart 5. The free end of the second link 18 is rotatably connected to one end of the first lever 22. The other end of the first lever 22 is rotatably connected to one end of the lever link 23. The other end of the lever link 23 is rotatably connected to one end of the second lever 24.

When an operation signal is supplied to the actuator main body 15, the piston rod 16 moves forward and backward in a linearly manner. The first link 17 is rotated to angularly displace in accordance with the linear displacement of the piston rod 16. In accordance with such a main action of the first link mechanism 13, the second link mechanism 14 operates. The first lever 22 of the second link mechanism 14 is rotated in accordance with a composite movement of a rotating operation and a linear moving operation of the second link 18.

A center line of a shaft 25 passes through the wheels 6 of the both sides of the cart, and the wheels 6 are rotatably supported by the shaft 25 in a plane parallel to the dedicated rail plane 2. The shaft 25 is supported by the cart 5. The first lever 22, the second link mechanism 14, the second lever 24, and the axle 25 form a 4-coupling link mechanism of a parallelogram. Therefore, the parallelogram is transformed in accordance with the composite movement of the second link 18, and the planes (vertical planes) at the both ends orthogonal to the rotation axis 25 of the wheel 6 is rotated to the axle 25 to be parallel each other.

Figure 4:
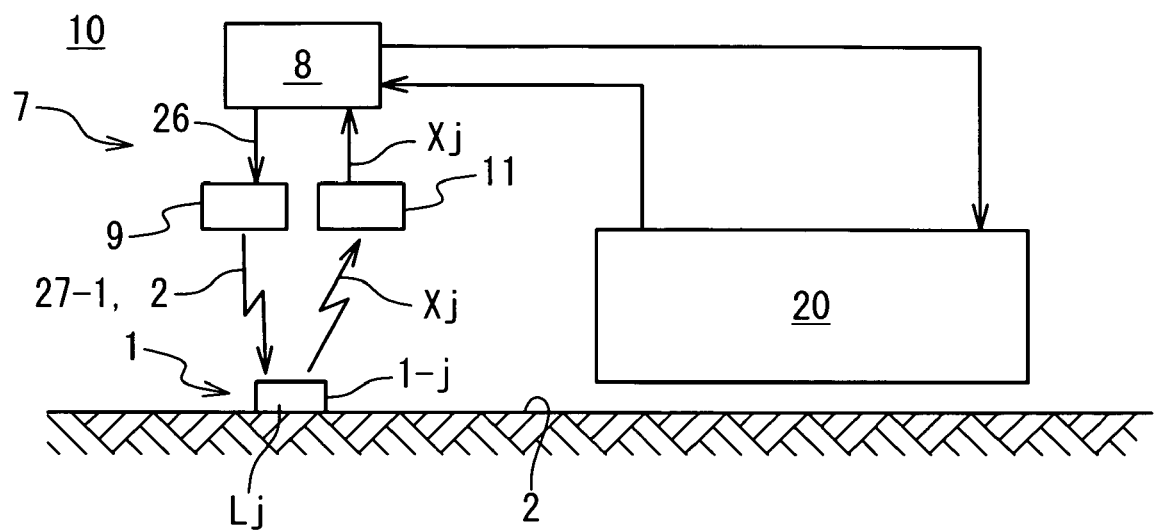
FIG. 4 is a block diagram showing a control section and the drive section in the steering apparatus of the rail non-contact vehicle according to the first embodiment of the present invention.

FIG. 4 shows a relation between the control section 10 and the drive section 20. The control section 10 is provided with the guide line 1 and a steering control section 7. The steering control section 7 is provided with a control unit 8, a transmitting unit 9, and a receiving unit 11. The control unit 8 transmits a data acquisition command signal 26 to the transmitting unit 9. The transmitting unit 9 sends a data acquisition operation signal 27 in response to the data acquisition command signal 26. The data acquisition operation signal 27 includes a data transmitting request signal 27-1. The data acquisition operation signal 27 may include power 27-2 to be supplied. A ground side power supply which supplies power to the guide line 1 is not necessary when the supplied power 27-2 is used.

The guide line 1 is divided into sections between a start point and a terminal point in a same interval, and has a sequence of position data $X_j$ for the sections. The sequence of position data $X_j$ expresses the sequence of the 1-dimensional curved coordinates. When the guide line 1 is a circular guide line, the coordinate of the terminal point is identical to the coordinate of the start point. It is preferred that the interval is no more than one cm. The 1-dimensional curved coordinate X is strictly defined on a 3-dimensional absolute coordinate system. The sequence of the one-dimensional curved coordinates X of the guide line 1 is a sequence of line formation elements 1-j. Each line formation element 1-j corresponds to the 1-dimensional position coordinate (position data) $X_j$. The line formation element 1-j sends the position data $X_j$, a target steering angle $\theta^*(X_j)$, and a target rail deviation $\Delta R^*$ in response to the data transmitting request signal 27-1. The receiving unit 11 receives the position data $X_j$, the target steering angle $\theta^*(X_j)$, and the target rail deviation $\Delta R^*$ and transfers them to the control unit 8. It is effective that the line formation element 1-j has an operation control data such as a 3-dimensional absolute coordinate value and a 3-dimensional defined velocity value corresponding to the position data $X_j$. A 3-dimensional rail curvature and a 3-dimensional acceleration can be calculated from the 3-dimensional absolute coordinate and the 3-dimensional defined velocity. In order to omit calculation, however, it is effective to provide a table (the position data $X_j$, the target steering angle, the target rail deviation, the target velocity, the target acceleration, the rail curvature). Such a table may be provided for the line formation element 1-j, or provided for the control unit 8. When the table is provided for the line formation element 1-j, the table is contained with the target steering angle, the target rail deviation, the target velocity, the target acceleration, and the rail curvature corresponding to the element 1-j. Alternatively, when the table is provided for the control unit 8, the target steering angle, the target rail deviation, the target velocity, the target acceleration, and the rail curvature are searched based upon the position data $X_j$.

Figure 5:
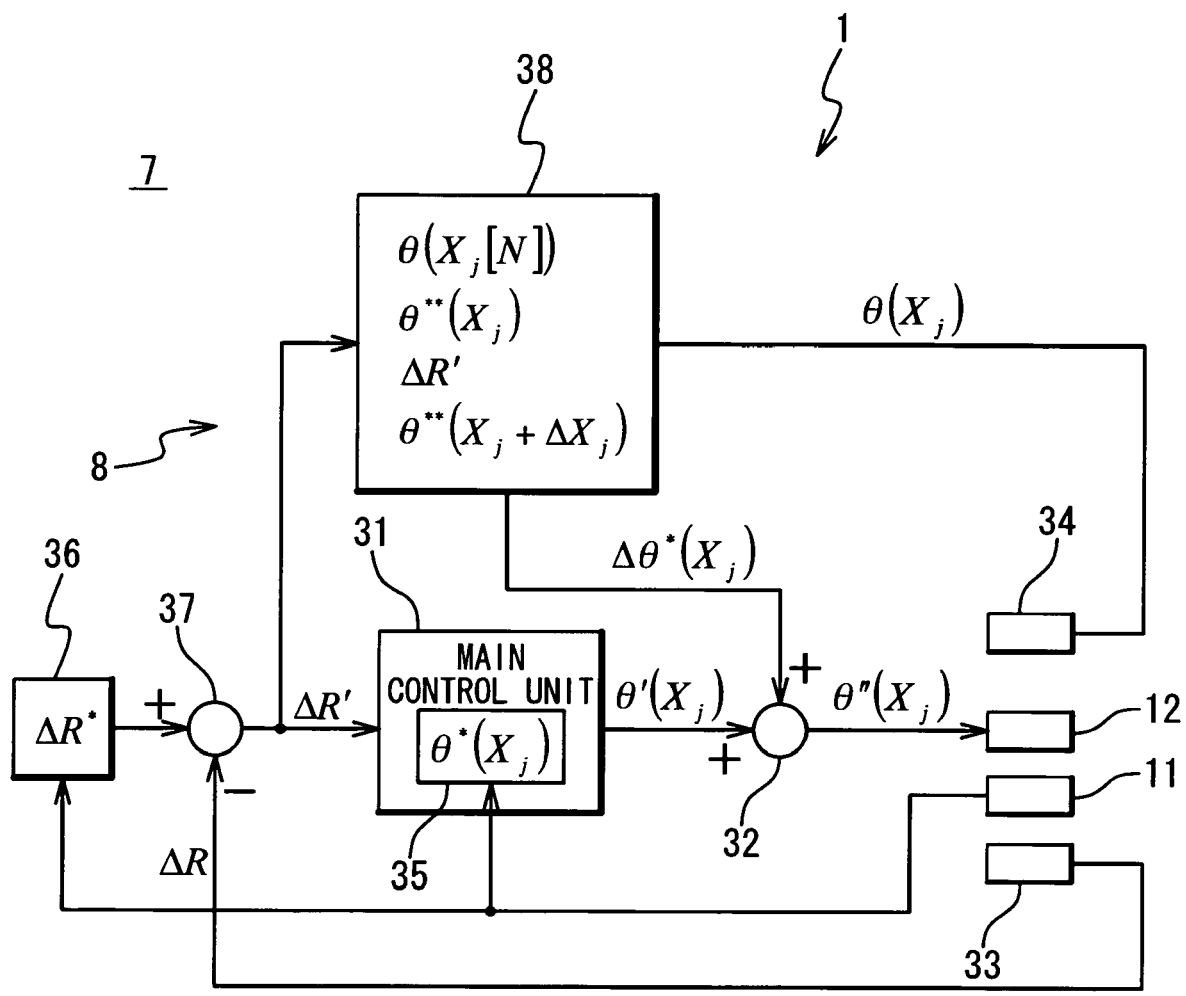
FIG. 5 is a circuit block diagram showing the control section according to the first embodiment of the present invention.

FIG. 5 shows the details of the steering control section 7. The steering control section 7 carries out a control operation based on a 4-dimensional coordinate system. Time coordinate is defined based on an internal clock (not shown). Space coordinate is defined based on a 3-dimensional coordinate. The rail reference curve expressed with 1-dimensional curved coordinate system is set within the 3-dimensional coordinate system.

The steering control section 7 is provided with the control unit 8, a rail deviation measuring unit 33, and a steering angle detector 34. The control unit 8 is provided with a rail deviation setting unit 36, a subtraction unit 37, a steering angle prediction correction controller 38, a main controller 31 containing a steering angle calculation section 35, and a correction adding unit 32.

The rail deviation setting unit 36 sets the target rail deviation $\Delta R^*(X_j)$ received through the receiving unit 11 from the guide line 1. The target rail deviation $\Delta R^*$ is set as an ideal value or target value $\Delta R^*(X_j)$ for the position data $X_j$. The target rail deviation $\Delta R^*(X_j)$ is not always zero. The target rail deviation $\Delta R^*(X_j)$ can be set to zero on a straight line rail. However, it is ideal in a rail region which the rail changes from a straight line rail to a curved rail that the centrifugal force inertia of the vehicle is taken into consideration. In this case, the vehicle runs on an actual rail that is set outer than the guide line 1. The target rail deviation $\Delta R^*(X_j)$ is set as a distance between such an ideal rail and the guide line 1. When the guide line 1 is set to contain the target rail deviation $\Delta R^*$, the target rail deviation $\Delta R^*(X_j)$ is a constant value of zero.

The receiving unit 11 is arranged as a detector which detects the position data $X_j$ in a reference point of the vehicle 3. It is preferred for such reference point to be set on rotation axis of the vehicle main body 4 with respect to the cart. The receiving unit 11 receives the target steering angle $\theta^*(X_j)$ which is fixedly defined in the guide line 1 to output to the steering angle calculation section 35.

The rail deviation measuring unit 33 is arranged in the reference point, and measures a current rail deviation $\Delta R$ in the direction normal to the guide line (a direction orthogonal to the rail or a curvature-radius direction). A CCD camera is preferred as a rail deviation measuring unit 33. The CCD camera takes photos of the guide line 1. The rail deviation measuring unit 33 calculates a distance between an optical axis of the CCD camera, and the guide line picked-up as a real image. Therefore, the current rail deviation $\Delta R$ corresponds to the calculated distance. The current rail deviation $\Delta R$ is supplied to the subtraction unit 37.

The steering angle detector 34 detects a quantity of movement of the piston rod 16 to the actuator main body 15 of the actuator 12 as a current steering angle $\theta(X_j)$ in real-time. The current steering angle $\theta(X_j)$ is output to the steering angle prediction correction controller 38.

The subtraction unit 37 is interposed between the rail deviation setting unit 36 and the steering angle calculation section 35. The target rail deviation $\Delta R^*(X_j)$ is supplied to the subtraction unit 37 together with the current rail deviation $\Delta R(X_j)$. The subtraction unit 37 carries out the following calculation and determines a control rail deviation $\Delta R'(X_j)$.

$$\Delta R' = \Delta R^* - \Delta R$$

The control rail deviation $\Delta R'(X_j)$ is supplied as a feedback control signal to the steering angle calculation section 35 and the steering angle prediction correction controller 38.

The steering angle calculation section 35 sets the target steering angle $\theta^*(X_j)$ for the position data $X_j$ received by the receiving unit 11. With the target steering angle $\theta^*(X_j)$, the data fixedly defined in the guide line 1 is supplied through the receiving unit 11 to the steering angle calculation section 35. However, the target steering angle $\theta^*(X_j)$ may be defined as a table $(X_j, \theta^*(X_j))$ in the steering angle calculation section 35. Thereafter, the main controller 31 determines a provisional control steering angle $\theta'(X_j)$ which is obtained by weighting the control rail deviation $\Delta R'(X_j)$ and the target steering angle $\Delta\theta^*(X_j)$ with a rate of 2 to 1. The provisional control steering angle $\theta'(X_j)$ is supplied to the correction adding unit 32.

The correction adding unit 32 receives the provisional control steering angle $\theta'(X_j)$ from the steering angle calculation section 35, receives a correction steering angle $\Delta\theta^*(X_j)$ from the steering angle prediction correction controller 38, and adds the correction steering angle $\Delta\theta^*(X_j)$ to the provisional control steering angle $\theta'(X_j)$. Thus, a target control steering angle $\theta''(X_j)$ is generated. The target control steering angle $\theta''(X_j)$ is output to the actuator 12 of the vehicle 3. In this way, a rudder is controlled.

The steering angle prediction correction controller 38 receives the control rail deviation $\Delta R'$ outputted from the subtraction unit 37. The steering angle prediction correction controller 38 receives and holds the current steering angle $\theta(X_j)$ measured by the steering angle detector 34. The controller 38 generates an index from the current steering angles $\theta(X_j)$ for N times corresponding to the identical position of the guide line 1 in the past operation, and holds the index as an operation history steering angle $\theta(X_j, [N])$. The best operation in the numerous operation records is experientially determined based on questionnaires collected from passengers, real riding experience of specialists, and real operation of an expert (although the steering unit for an operator does not exist, the operator can generate a steering angle signal from a terminal input unit).

The steering angle prediction correction controller 38 has an optimal target steering angle $\theta^{}(X_j)$. The optimal target steering angle $\theta^{}(X_j)$ expresses a suitable steering angle in each position of the guide line 1. Therefore, the steering angle prediction correction controller 38 has the current optimal target steering angle $\theta^{}(X_j)$ to the current position $X_j$ of the vehicle, and a future optimal target steering angle $\theta^{}(X_j+\Delta X_j)$ when the vehicle advances from the current position $X_j$ to a future position $(X_j+\Delta X_j)$ by $\Delta X_j$. The $\Delta X_j$ is set as a function of the variable j of the current position $X_j$, and may be set based on a future rail curvature of the guide line 1. In that case, when a change rate in the curvature between the current position $X_j$ and the future position $(X_j+\Delta X_j)$ is small, the $\Delta X_j$ is set larger. Also, when the change rate of the curvature is large, the $\Delta X_j$ is set smaller. The steering angle prediction correction controller 38 calculates a correction steering angle $\Delta\theta^*(X_j)$ by weighting the control rail deviation $\Delta R'$, the current optimal target steering angle $\theta^{}(X_j)$, and the future optimal target steering angle $\theta^{}(X_j+\Delta X_j)$ with the rate of 3 to 1. The calculated correction steering angle $\Delta\theta^*(X_j)$ is supplied to the adding unit 32. The optimal target steering angle $\theta^{}(X_j)$ may be determined based upon the operation history steering angle $\theta(X_j [N])$. It is preferable to determine the optimal target steering angle $\theta^{}(X_j)$ in such a way that the vibration resulting from steering of the vehicle be minimized. Alternately, a table regarding the current position $X_j$ is provided and the optimal target steering angle $\theta^{**}(X_j)$ may be searched from the table. When a velocity sensor (not shown) is provided for the vehicles 3, the velocity V of the vehicle may be received from a velocity sensor. The 2-dimensional coordinate position of the vehicle is calculated through integration of the velocity.

As described above, the rail deviation setting unit 36 and the steering angle calculation section 35 use the target rail deviation $\Delta R^*(X_j)$ and the target steering angle $\theta^*(X_j)$ that correspond to the current position of the vehicle 3. It takes time for the data to be able to be outputted after setting. In actual, there might be a case where the output may be possible when the vehicle 3 progresses to a position of $X_{j+1}$. In such a case, the target rail deviation $\Delta R^*(X_{j-1})$ and the target steering angle $\theta^*(Xj_{-1})$ that are prior to the current position of the vehicle by one element may be used.

The steering angle prediction correction controller 38 carries out an optimal control calculation to determine the optimal correction steering angle $\Delta\theta^{**}(X_j)$. The optimal control calculation is possible by a learning calculation, or a dynamic equation calculation, or by a combination of these two calculations. As the learning calculation, it is preferred to use a neural network calculation or a genetic algorithm calculation, or a genetic algorithm calculation in which the neural network calculation is incorporated. The neural network calculation and the genetic algorithm calculation are commonly known as a calculation technique. As the dynamic equation calculation, it is preferred to use the minimum square value calculation (4-dimensional navigation) with respect to acceleration among the rails which shortcut passage candidate points by the inverse dynamics of the dynamic equation of the 4-dimensional coordinates. The 4-dimensional navigation is known as an optimal route discovery technique for airplane.

Learning Calculation:

The control rail deviation $\Delta R'$, the current steering angle $\theta^*(X_j)$, and the future optimal steering angle $\theta^{**}(X_j+\Delta X_j)$ are inputted to the input side of the neural network as a learning data under a constraint condition in which these data are smaller than setting threshold values. Also, the correction steering angle $\Delta\theta^*(X_j)$ corresponding to those data is inputted to the output side of the neural network as a teacher data. When $\Delta X_j$ is supposed to be set to "1", the current optimal target steering angle $\theta^{}(X_j)$ and the future optimal target steering angle $\theta^{}(X_j+\Delta X_j)$ are expressed as a current optimal target steering angle $\theta^{}(X_j)$ and a future optimal target steering angle $\theta^{}(X_{j+1})$, respectively. Each of nodes of the neural network has coefficients k1, k2, k3 and k4. The coefficient is generally a function of coordinate $X_j$. The neural network is a technique to determine the coefficient f as an inverse function solution with x and y known in simultaneous multivariable linear function y=f*x (y and x are multi-variable vectors). The neural network learns many combinations of the learning data and the teacher data. At this time, although the coefficient are not settled uniquely, the optimal solution of the coefficients can be gradually and approximately determined by giving many combinations (y, x) under the constraint condition (the least sum of second powers of accelerations, or the least sum of second powers of amplitudes). In this way, when an optional control rail deviation $\Delta R'$, the current optimal steering angle $\theta^{}(X_j)$, and the future optimal steering angle $\theta^{}(X_j+\Delta X_j)$ are given, the corresponding correction steering angle $\Delta\theta^*(X_j)$ can be outputted.

For example, the constraint condition is to express a distance deviation between the vehicle body positions in the identical position in the m-th operation and the n-th operation (m and n are not equal) as an amplitude Ws, and to take a plurality of different sets of values as m and n. Thus, minimizing square of the amplitudes is effective. Also, the constraint condition is to express accelerations of the vehicle body in the identical position in the m-th operation and the n-th operation as Am, and to take a plurality of different sets of values as m and n. Thus, minimizing square of the amplitudes is effective.

In order to attain the optimization in a high accuracy and in a high velocity, various well-known mathematical techniques as a genetic algorithm and others can be applied. The genetic algorithm (GA) is a method in which the control rail deviation $\Delta R'$, the current optimal steering angle $\theta^{}(X_j)$, the future optimal steering angle $\theta^{}(X_j+\Delta X_j)$, and the correction steering angle $\Delta\theta^*(X_j)$ are selected as unknown variables locally and globally in a random, and a solution asymptotically converges toward the optimal solution while trap into a local solution is avoided. An estimation function is set for the optimization. The estimation function is similar to a case of the neural network. A variable factor, of which the estimation function value is low but is not determined to be not selected, is selected. When the variable factor, of which valuation function value is high, but another optimal solution exists, the valuation function is not selected. The optimal calculation is repeatedly carried out while delicately exchanging many variables. Automatic evolution of a genetic program (GP) can be carried out by hierarchically organize the function (S equation expression of LISP) and by evolving an operator (tree structure of S equation expression) without restricting to evolution of the value of one variable for multi-dimension of the variables. Therefore, the optimization of steering angle control advances permanently with respect to the identical vehicle running a circular rail.

Physical Calculation:

A rail is determined as a solution for the dynamic equation having an initial condition to every time and the acceleration at the time as known values. In inverse dynamics, the velocity and/or acceleration is determined as a solution of the dynamic equation having the rail coordinates $X_j$ as an unknown value. In this case, a proximity to coordinate $X_j$ received from the guide line 1 is permitted as a coordinate $X_j$ of the vehicle 3 on the rail. Such constraint condition is given as a minimization of the square sum of the acceleration, or minimization of a sum of the second powers of acceleration deviations, and the shortest time to reach a destination. The constraint condition as minimization of acceleration gives a priority to a degree of comfort and mathematically defines velocity and/or acceleration. The acceleration solved in real time through inverse dynamics and the velocity at that time correspond to a ratio of 2 to 1 in a steering angle. The solution calculated in this way may be supplied to the output side of the above-mentioned neural network as the teacher data.

The correction steering angle $\Delta\theta^*(X_j)$ obtained thus is outputted to the correction adding unit 32 from the steering angle prediction correction controller 38. The correction adding unit 32 calculates the following equation.

$$\theta''(X_j) = \theta'(X_j) + \Delta\theta^*(X_j)$$

When the vehicle 3 is ideally controlled at the current position (the 4-dimensional current position) at the current time and runs on a straight line rail, the provisional control steering angle $\theta'(X_j)$ is zero.

(1) Continuous Ideal Running State ($\Delta R'=0$)

Figure 6:
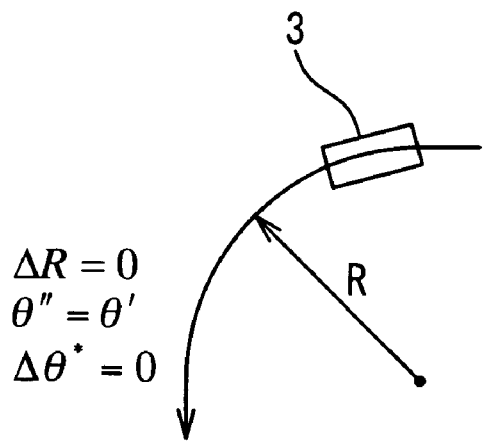
FIG. 6 is a plan view showing a steering angle controlling method.
Figure 7:
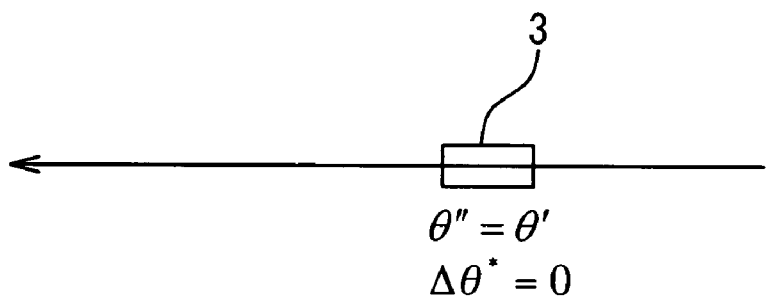
FIG. 7 is a plan view showing other steering angle controlling method.

In the ideal running state, the correction steering angle $\Delta\theta^*(X_j)$ is zero in principle, and $\theta''(X_j)=\theta'(X_j)$ in general. FIG. 6 shows the ideal running state on a circular rail where the curvature radius R is constant. Also, FIG. 7 shows the ideal running state on a straight line rail where the curvature radius R ideally infinite.

(2) Momentary Ideal Running State ($\Delta R'\neq 0$)

Figure 8:
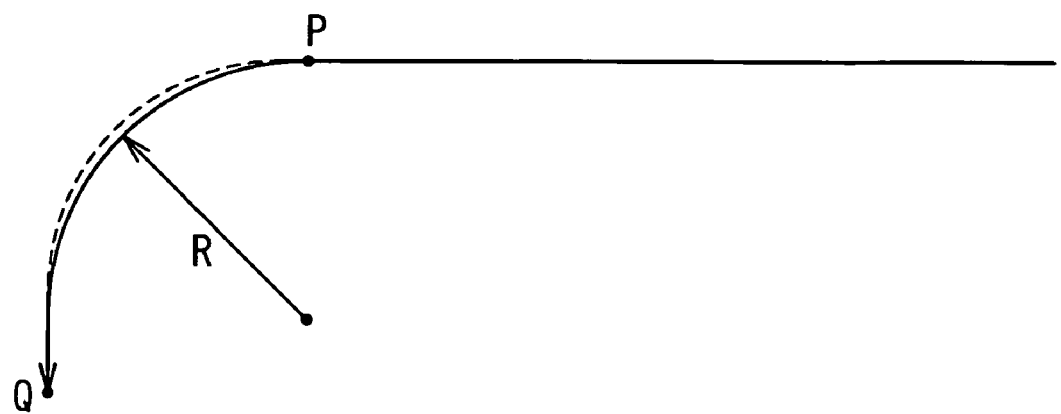
FIG. 8 is a plan view further showing the steering angle controlling method.

FIG. 8 shows a curvature changing point P where the rail changes from a straight line rail to a constant curvature rail (curvature radius=R). In the 4-dimensional navigation, there is no case that the actuator 12 instantly changes a steering angle from zero to a defined steering angle $\theta'$ at the point P. A predetermined steering angle $\theta^*$ corresponding to the constant curvature rail is set in the steering angle calculation section 35. In such a case, the correction steering angle $\Delta\theta^*(X_j)$ is zero at the point P, and the control steering angle $\theta''(X_j)$ is equal to the provisional control steering angle $\theta'(X_j)$. It is ideal that the correction steering angle $\Delta\theta^*(X_j)$ smoothly increases thereafter, becomes maximum at the middle point between the point P and a point Q, smoothly decreases after passing through the middle point, and becomes zero at the point Q.

(3) Non-Ideal Running State 1 ($\Delta R'\neq 0$ or $\Delta R'=0$)

Figure 9:
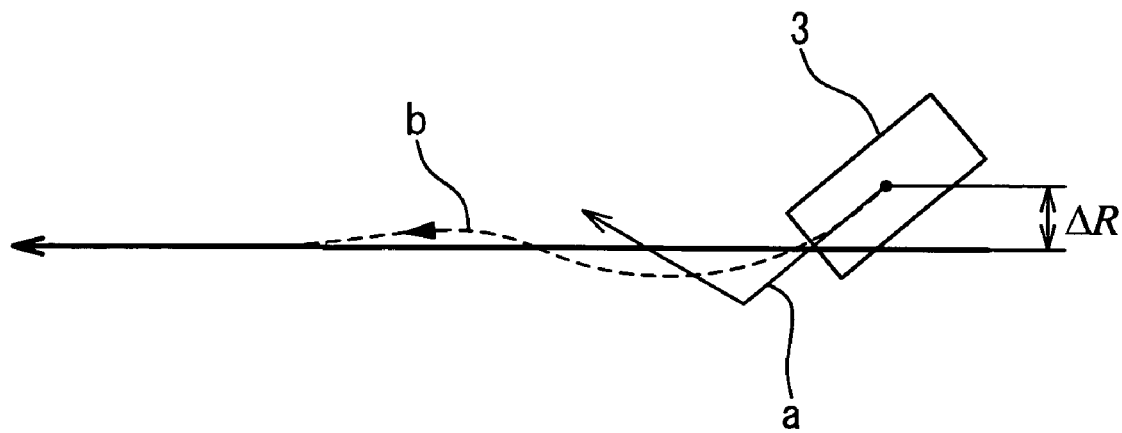
FIG. 9 is a plan view further showing the steering angle controlling method.

As shown in FIG. 9, when the vehicle runs out of the rail, the control steering angle $\theta''(X_j)$ and the provisional control steering angle $\theta'(X_j)$ are not coincident with each other. As shown in FIG. 9, when the change rate of a rail curvature does not change greatly in the near future, and particularly when the rail is a straight line rail, $\theta'$ approaches $\theta^*$ smoothly through feedback control. When the straight line rail continues long enough, the steering angle change per unit clock depends less on rail deviation $\Delta R$, or may be proportional. The vehicle gradually approaches to the straight line rail not along the solid line display rail a but along the dotted line display rail b. When the control rail deviation $\Delta R'$ is zero, the steering angle change per unit clock is set still smaller. The steering angle change per unit clock further corresponds to the difference between the current steering angle $\theta(X_j)$ and the current defined target steering angle $\theta^*(X_j)$, or particularly may be proportional.

$$\Delta\theta^*(X_{j+1}) = \theta''(X_{j+1}) - \theta(X_{j+1}),$$
$$= -k1 \times \Delta R' + k2 \times (\theta''(X_j) - \theta'(X_j))$$

The above k1 and k2, and k3 and k4 to be described below are the coefficients of the nodes in the neural network.

(4) Non-Ideal Running State 2 ($\Delta R'\neq 0$ or $\Delta R'=0$)

Figure 10:
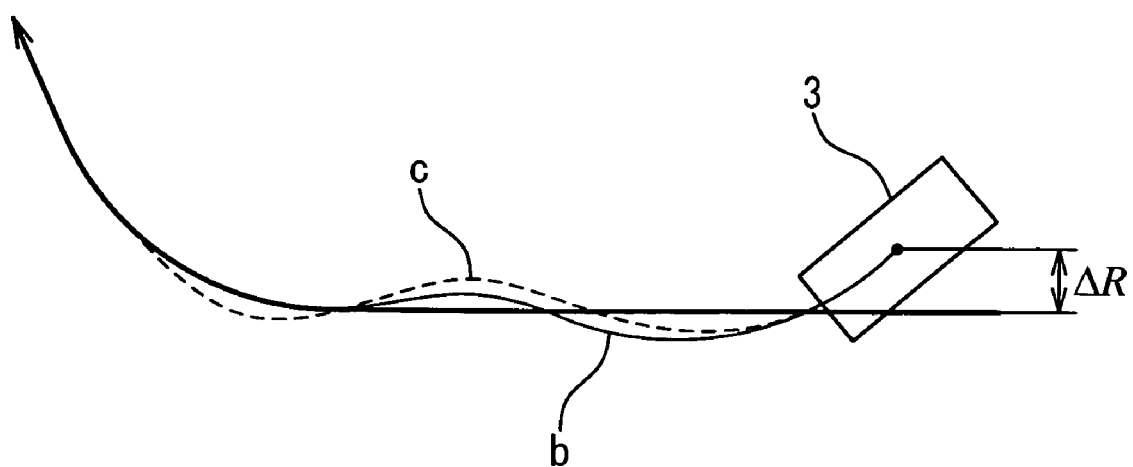
FIG. 10 is a plan view showing another steering angle controlling method.

In such a case that the rail curvature changes greatly in future as shown in FIG. 10, the curvature change of the curved rail of the near future instead of the best rail b as shown FIG. 9 is fed forward, i.e., predicted and fed in advance, and the correction steering angle $\Delta\theta^*(X_j)$ is outputted from the steering angle prediction correction controller 38 to the correction adding unit 32 for the vehicle to smoothly approximate the future curvilinear rail.

$$\Delta\theta^*(X_{j+1}) = \theta''(X_j) - \theta'(X_j)$$
$$= -k1 \times \Delta R' + k2 \times (\theta''(X_j) - \theta'(X_j)) + \Delta\theta^*(X_j)$$
$$\Delta\theta^* = k3 \times \theta^*(X_j + \Delta X_j) + k4 \times \Delta R$$

Figure 11:
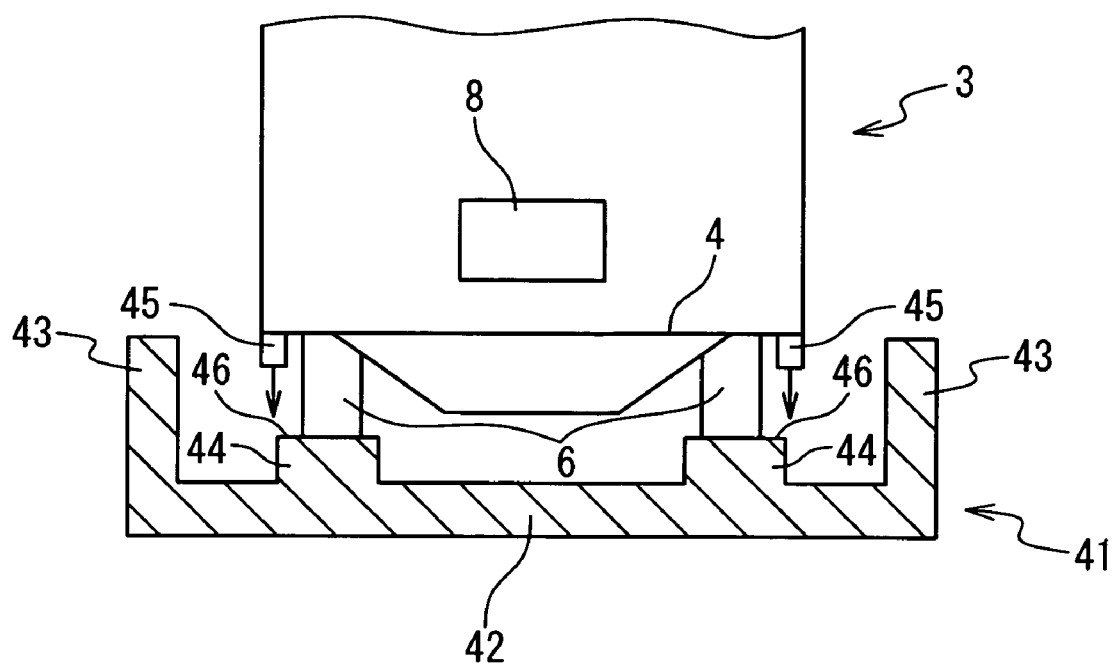
FIG. 11 is a sectional view showing a deviation detecting method in the steering apparatus of the rail non-contact vehicle according to a second embodiment of the present invention.
Figure 12:
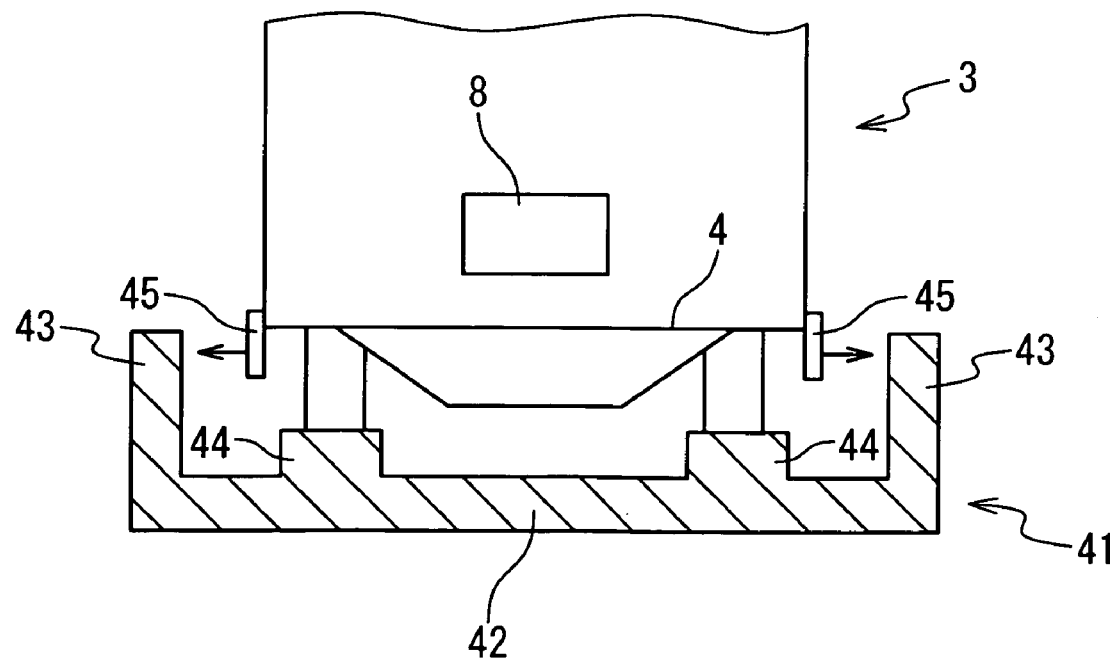
FIG. 12 is a sectional view showing a modification of the deviation detecting method shown in FIG. 11.

A deviation detection method according to the second embodiment of the present invention will described with reference to FIG. 11. Referring to FIG. 11, a non-contacting type guide rail 41 is provided instead of the guide line 1 in the control section 10 of the second embodiment of the present invention. The guide rail 41 is provided with a rail bottom 42, a curbstone 43, and a pair of central guide rails 44. The wheels 6 on the both sides of the vehicle are supported by the central guide rails 44 to rotate. At the right and left ends of the vehicle main body 4 of the vehicle 3, position detecting sensors 45 are fixedly arranged respectively. A position detecting sensor 45 corresponds to a pair of the transmitting unit 9 and the receiving unit 11 as described above. The position detecting sensor 45 is a non-contacting type sensor such as a CCD camera and an automatic focal position focusing laser. The position detecting sensor 45 detects the relative location between the line edge 46 of the central guide rail 44 and the vehicle main body 4. When the vehicle 3 is in a normal position, the position detecting sensor 45 generates an image in which the line edge 46 is coincident with the central line of the CCD camera. The position detecting sensor 45 detects a position deviation $\Delta D$ as a distance between the central line of the CCD camera and the line edge 46. The position deviation $\Delta D$ is supplied to the steering angle calculation section 35 and the steering angle prediction correction controller 38 of the control unit 8 as the above-mentioned $\Delta R'$. As shown in FIG. 12, the position detecting sensor 45 may be arranged fixedly to the side wall of the vehicle main body 4. In this case, the position detecting sensor 45 detects the distance or the distance deviation between a reference surface of the side wall of the vehicle main body 4 and the inner surface of the curbstone 43. A difference $\Delta R'$ between a preset value $\Delta R$ and the position deviation $\Delta D$ may be supplied to the steering angle calculation section 35 and the steering angle prediction correction controller 38 of the control unit 8 as shown in the first embodiment.

Figure 13:
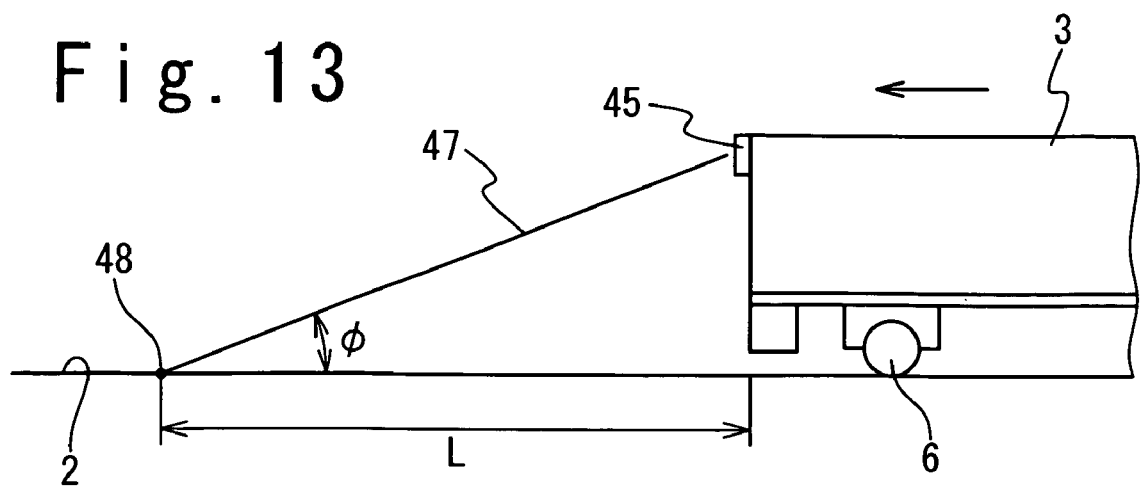
FIG. 13 is a sectional view showing the deviation detecting method in the steering apparatus of the rail non-contact vehicle according to a third embodiment of the present invention.
Figure 14:
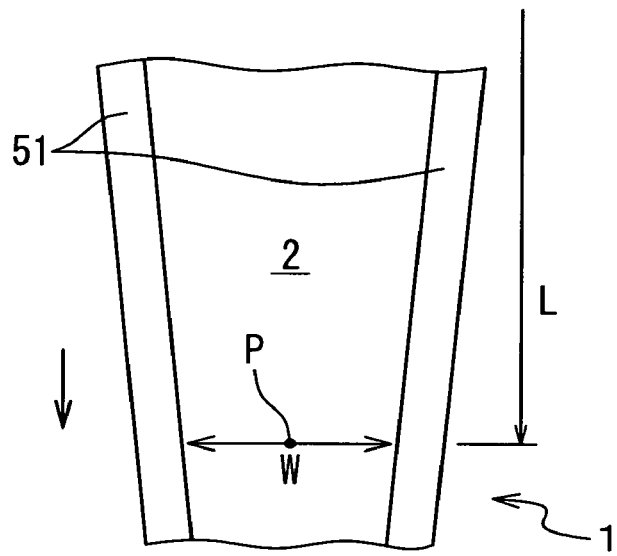
FIG. 14 is a sectional view showing a modification of the deviation detecting method in the steering apparatus position of the rail non-contact vehicle according to the third embodiment of the present invention.

Referring to FIG. 13, the deviation detection method according to the third embodiment of the present invention will be described. Referring to FIG. 13, the position detecting sensor 45 in the third embodiment of the present invention is fixedly arranged at the head section of the upper section of the vehicle 3. An optical axis 47 of the position detecting sensor 45 intersects the road surface 2 at a predetermined angle Φ. The distance L between intersection 48 of the optical axis 47 and the road surface 2 and the reference point of the vehicle 3 is constant. As shown in FIG. 14, when the CCD camera is used as the position detecting sensor 45, the width W between rail belt signs 51 drawn or embedded on the road surface 2 as a rail surface is detected as a width at a relative location defined for the distance L. The CCD camera detects the distance deviation ΔW between the reference point P set on the image and the central point of the width W. The deviation ΔW is processed similarly to the position deviation ΔD in the second embodiment.

Figure 15:
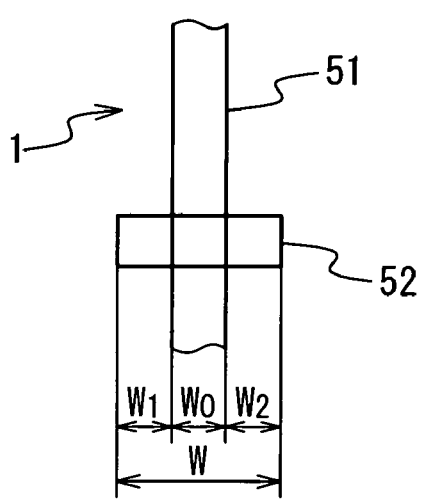
FIG. 15 is a sectional view showing the deviation detecting method in the steering apparatus position of the rail non-contact vehicle according to a fourth embodiment of the present invention.

Referring to FIG. 15, the deviation detection method according to the fourth embodiment of the present invention will be described. Referring to FIG. 15, the guide line 1 has a single rail belt sign 51 in the fourth embodiment of the present invention. A reference image 52 with a reference width W is set on the image by the CCD camera. The rail belt sign 51 picked-up by the CCD camera and the reference image 52 are superimposed to produce three different kinds of images with width W1, W2 and W0. In this case, the following relation is met $$W = W1 + W0 + W.$$

The deviation ΔW is processed similarly to the position deviation ΔD shown in the second embodiment, such that the absolute value of deviation ΔW (=W2−W1) becomes small.

Figure 16:
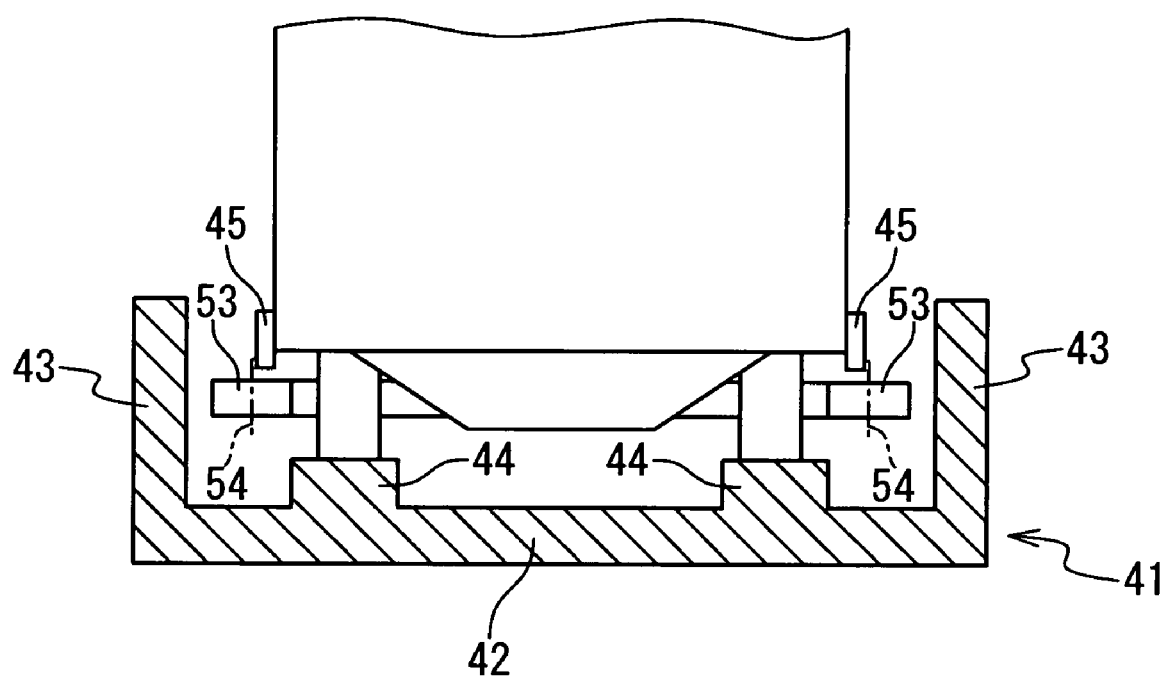
FIG. 16 is a sectional view showing the deviation detecting method in the steering apparatus position of the rail non-contact vehicle according to a fifth embodiment of the present invention.

Referring to FIG. 16, the deviation detection method according to the fifth embodiment of the present invention will be described. Referring to FIG. 16, safe guide rings 53 are added to the vehicle 3 of the FIG. 12 in the fifth embodiment of the present invention. The safe guide ring 53 is provided on either side of the main body of the vehicle 3 or the cart 5. A rotation shaft 54 of the safe guide ring 53 is parallel to the opposing surface of the curbstone 43 on either side. The safe guide ring 53 does not contact the curbstone 43. In this case, the construction cost of the safe guide ring 53 which does not contact the curbstone 43 is significantly lower compared with the construction cost of the well-known guide rail for guide rails. There is no noise generated between the curbstone 43 and the safe guide ring 53, or no vibration is generated in the body of the vehicle.

It is preferred to add a rotation frequency detector (not shown) which detects the number of rotations of the wheel 6. An absolute position data on the one-dimensional curved coordinate L of the cart 5 or the vehicle 3 and a relative location data between the cart 5 or the vehicle 3 and the guide line 1 are added as control data. The absolute position data may be measured by a measuring unit in a kinetic system. As already described in the first embodiment, the absolute position data may be acquired from the guide line 1 (ubiquitous sensor).

Figure 17:
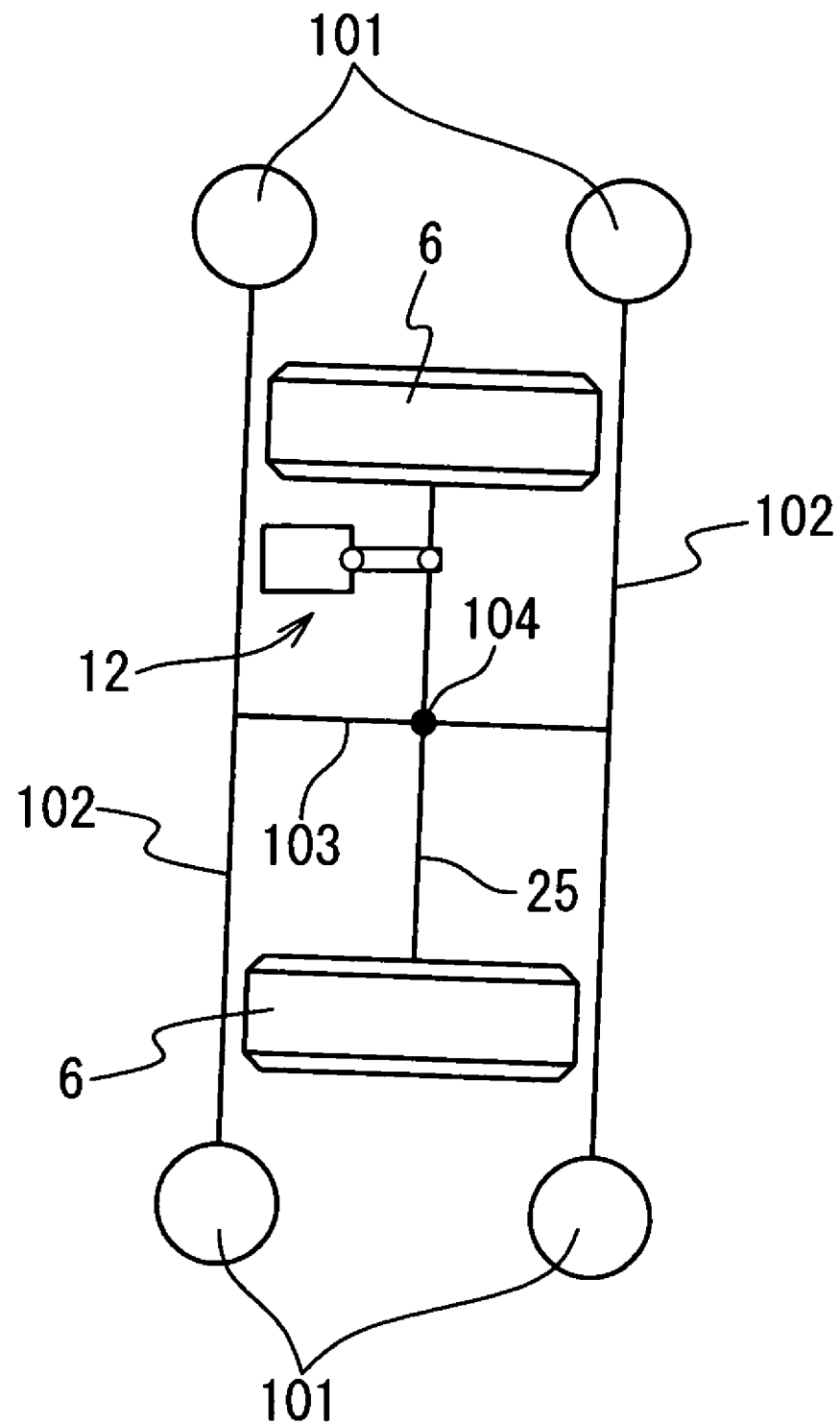
FIG. 17 is a plan view showing the drive section in the steering apparatus position of the rail non-contact vehicle according to a sixth embodiment of the present invention.

Referring to FIG. 17, the drive section 20 of a four-guide-ring type bogie according to the sixth embodiment of the present invention will be described. Referring to FIG. 17, four guide rings 101 in contact with a guide rail are supported at the right and left ends of the parallel isometric link 102, and the right and left wheels 6 are supported at both ends of the shaft 25. The front and rear parallel isometric links 102 are connected with a link 103. The link 103 and the shaft 25 are intersectingly connected at both middle points, and an intersection 104 is rotatably supported by the cart 5. When the four-guide-ring type bogie is applied to the first embodiment, the guide ring 101, the parallel isometric link 102, and the link 103 are removed, and the actuator 12 is connected with the shaft 25. When the four-guide-ring type bogie is applied to the second embodiment, the technique of the four guide ring bogie type is still adopted, but the guide rings 101 re arranged in such a way that they are not in contact with the curbstone 43.

Figure 18:
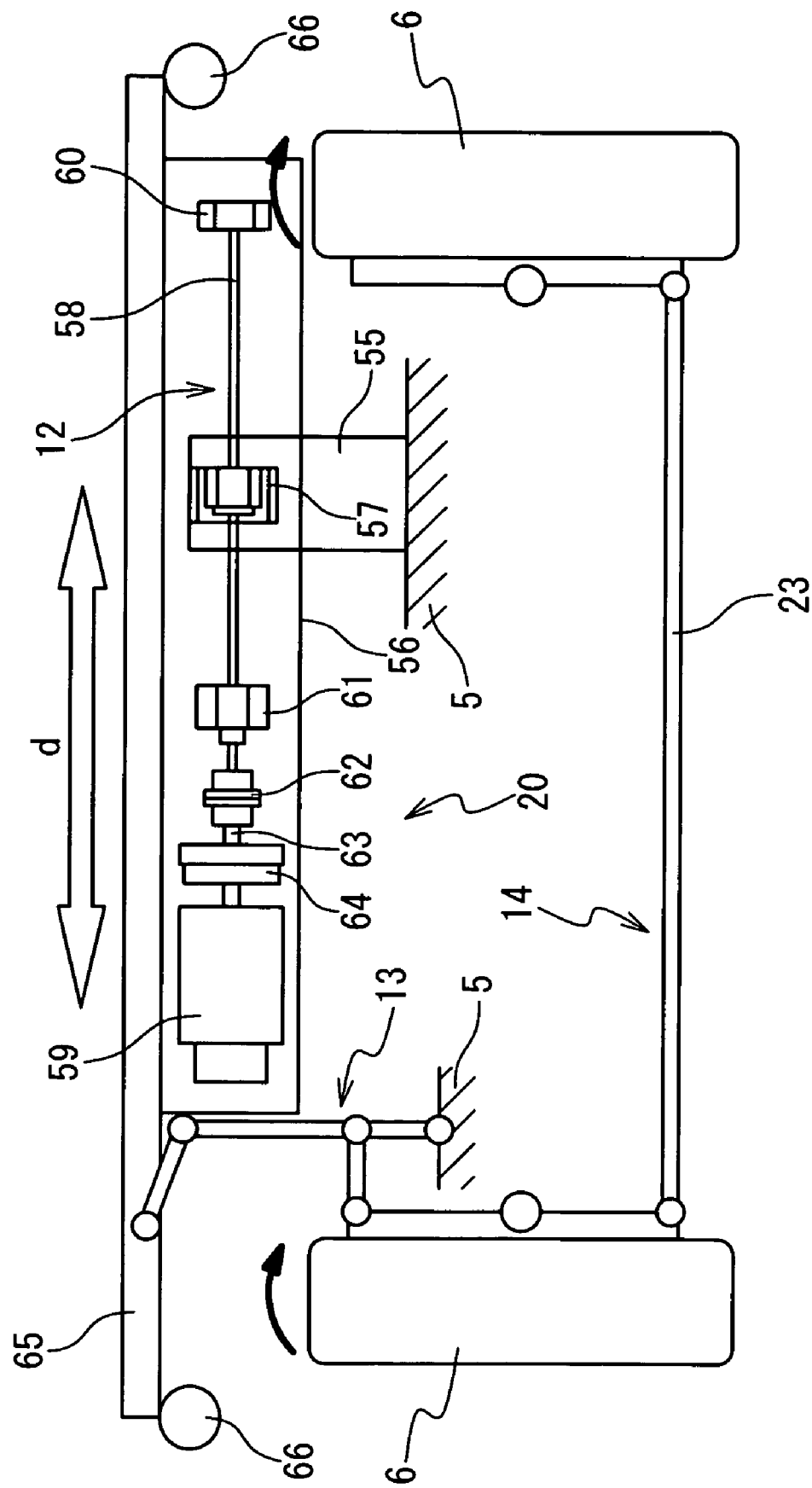
FIG. 18 is a sectional view showing the drive section in rail non-contact vehicle according to a seventh embodiment of the present invention.

Referring to FIG. 18, the drive section 20 of the steering system used in the steering apparatus of the rail non-contact vehicle according to the seventh embodiment of the present invention will be described. Referring to FIG. 18, the present embodiment realizes the above-mentioned real time high precision route control and the safety associated with the control. The feature is achieved by using a ball screw and a safety bar, and adding a safe clutch.

The drive section 20 is provided with the actuator 12, the first link mechanism 13, and the second link mechanism 14. An actuator fixed section 55 fixedly supported by the cart 5 is equivalent to the above-mentioned actuator main body 15. An actuator movable section 56 which moves forward and backward to the actuator fixed section 55 is equivalent to the above-mentioned piston rod 16. A nut 57 is fixed to the actuator fixed section 55. A ball screw 58 screwed in the nut 57 is rotatably supported by bearings 60 and 61 which are fixed to the actuator movable section 56. A servomotor 59 is fixedly arranged in the actuator movable section 56. The end of the ball screw 58 is connected via a coupling 62 with an output axis 63 of the servomotor 59. A clutch 64 is interposed in the output axis 63.

The safety bar 65 is connected with the actuator movable section 56, and moves forward and backward in a transverse direction d. At the both ends of the safety bar 65, safe rings 66 are rotatably attached. One end of the first link mechanism 13 is rotatably supported by the cart 5, and the other end of the first link mechanism 13 is supported by the safety bar 65 rotatably to the cart 5.

The servomotor 59 receives the above-mentioned target control steering angle θ″($X_j$) and rotates to a rotation position corresponding to the target steering angle. The ball screw 58 rotates to a corresponding rotation position, and moves to a linear position corresponding to the rotation position in response to the reaction from the nut 57. The actuator movable section 56 that linearly moves together with the ball screw 58 displaces the first link mechanism 13 and the second link mechanism 14. The lever link 23 displaces in response to the linear displacement of the second link mechanism 14 and rotates and drives the wheels 6 to the steering angle position corresponding to the target control steering angle θ″($X_j$).

During a normal control operation, the safe rings 66 on the right and left sides are not in contact with the safe guide (the curbstone 43 in FIG. 16). When the control rail deviation ΔR' shows an abnormally large value because there is a gust or the contact with another vehicle in an airport so that the vehicle comes off the guide line 1, the safe rings 66 of the vehicle 3 on the right and left sides contact the curbstone 43. In such a case, the impelling force of the vehicle in the above-mentioned automatic control is influenced with the reaction received from the curbstone 43. For this reason, the control position of the ball screw 58 and the actual position become different, and the difference between them is detected by the servomotor 61. Generation of interference may be detected by pressure sensors attached to safe rings 66 on the right and left sides. When the clutch 64 is disengaged upon detection of interference, the vehicle 3 runs for a while as being guided by the safe rings 66 on the right and left sides. However, the vehicle stops promptly when a braking acts. The drive source of the vehicle 3 is a diesel engine, a hybrid system of an electric motor and a diesel engine, or a fuel cell. In this embodiment, the use of the ball screw 58 makes control response accuracy higher and safety can be promptly secured at the time of abnormalities. The curbstone 43 has almost no function to support and guide the vehicle, but only supports the vehicle for a short period during which the control rail deviation ΔR' is detected and the vehicle stops. For this reason, the curbstone 43 needs almost no needs for strength, therefore the construction cost are made remarkably cheap.

Figure 19:
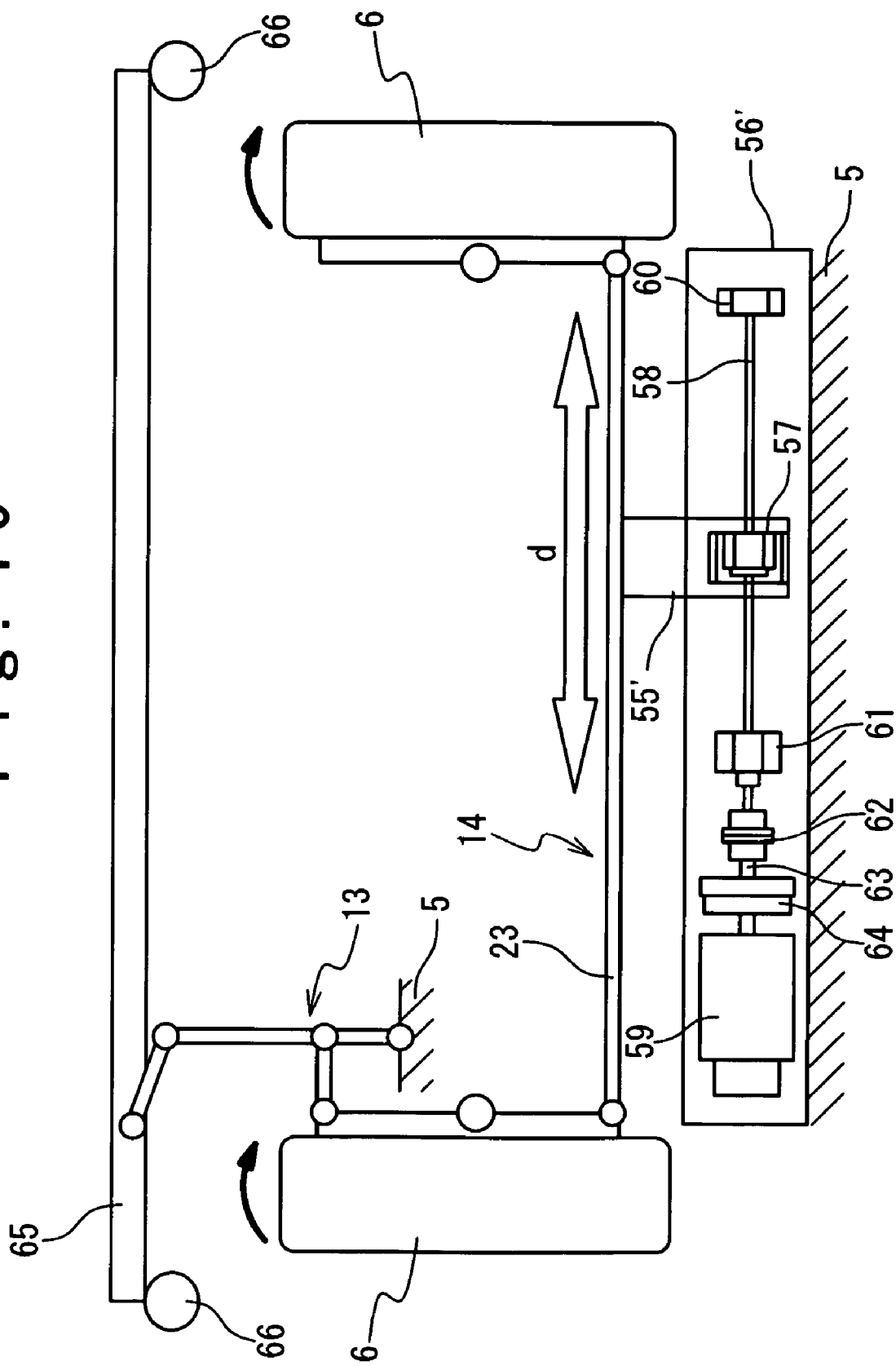
FIG. 19 is a sectional view showing a modification of the drive section in the rail non-contact vehicle according to the seventh embodiment of the present invention.

FIG. 19 shows a modification of the seventh embodiment shown in FIG. 18. The actuator movable section 56 is changed into an actuator fixed section 56'. The actuator fixed section 56' is fixed to the cart 5. The nut 57 is movably supported to the actuator fixed section 56' by the ball screw 58. The bearings 60, the servomotor 59, the coupling 62, the output axis 63, and the clutch 64 are arranged in the actuator fixed section 56' just as similarly as the one shown in the seventh embodiment. As in the above-mentioned embodiment, the end section of the first link mechanism 13 is rotatably supported by the cart 5, and another end of the first link mechanism 13 is rotatably supported by the safety bar 65.

As in the seventh embodiment in FIG. 18, the displacement of the safety bar 65, when the vehicle separates from the rail and contacts the curbstone 43, is transmitted to the wheel 6 via the first link mechanism 13 and the second link mechanism 14, the wheel 6 is steered corresponding to the curbstone 43, and the clutch 64 is instantly disengaged. The embodiment of FIG. 19 is relatively identical with the seventh embodiment of FIG. 18.

Figure 20:
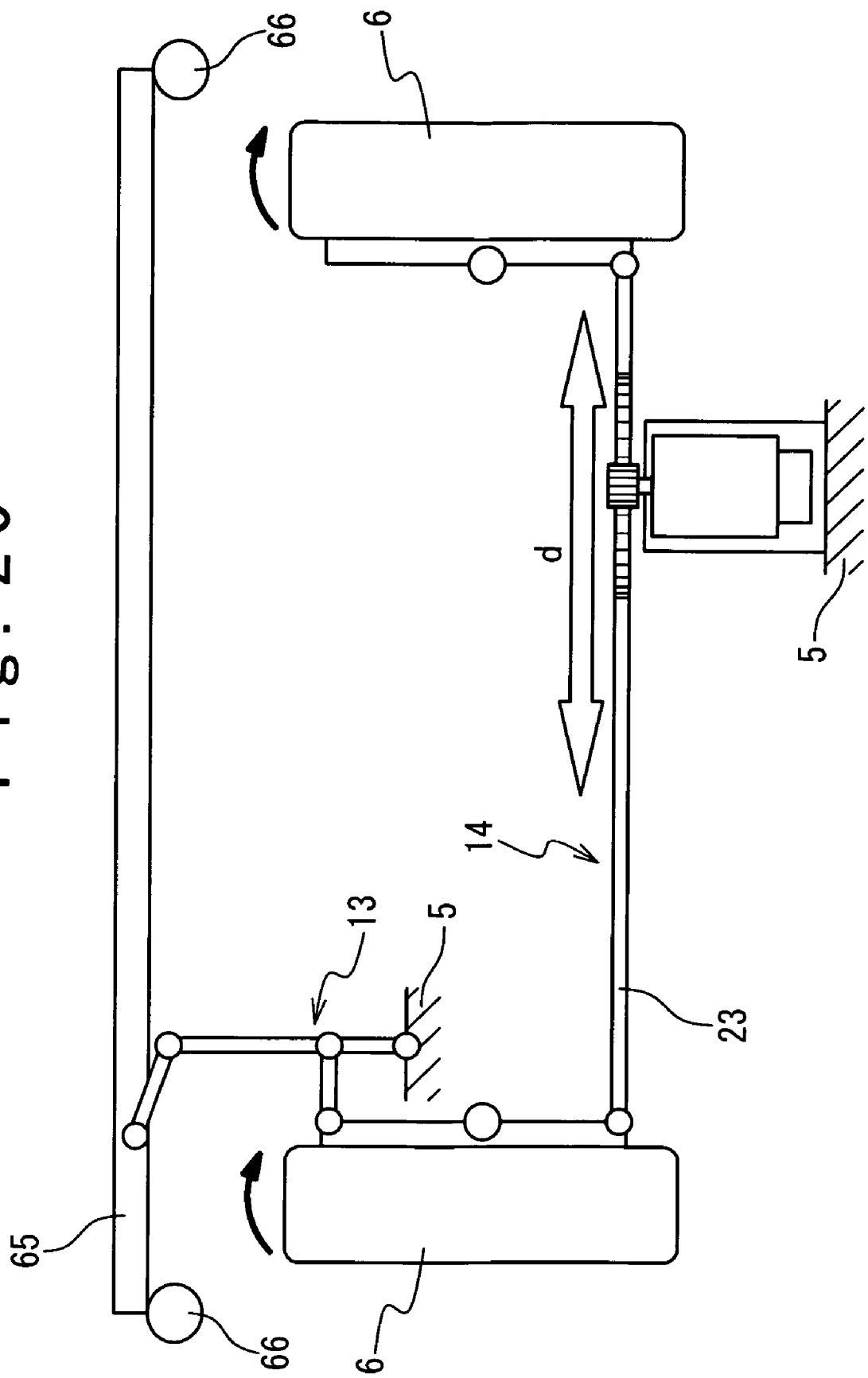
FIG. 20 is a sectional view showing the drive section in the rail non-contact vehicle according to an eighth embodiment of the present invention.

Referring to FIG. 20, the drive section 20 of the steering system used for the steering apparatus of the rail non-contact vehicle according to the eighth embodiment of the present invention will be described. Referring to FIG. 20, this embodiment uses a rack and pinion pair instead of the above-mentioned ball screw and nut pair. This embodiment shows less performance with respect to the steering accuracy, however, excels in reduction of the cost of the drive section compared with the aforementioned embodiment.

Figure 21:
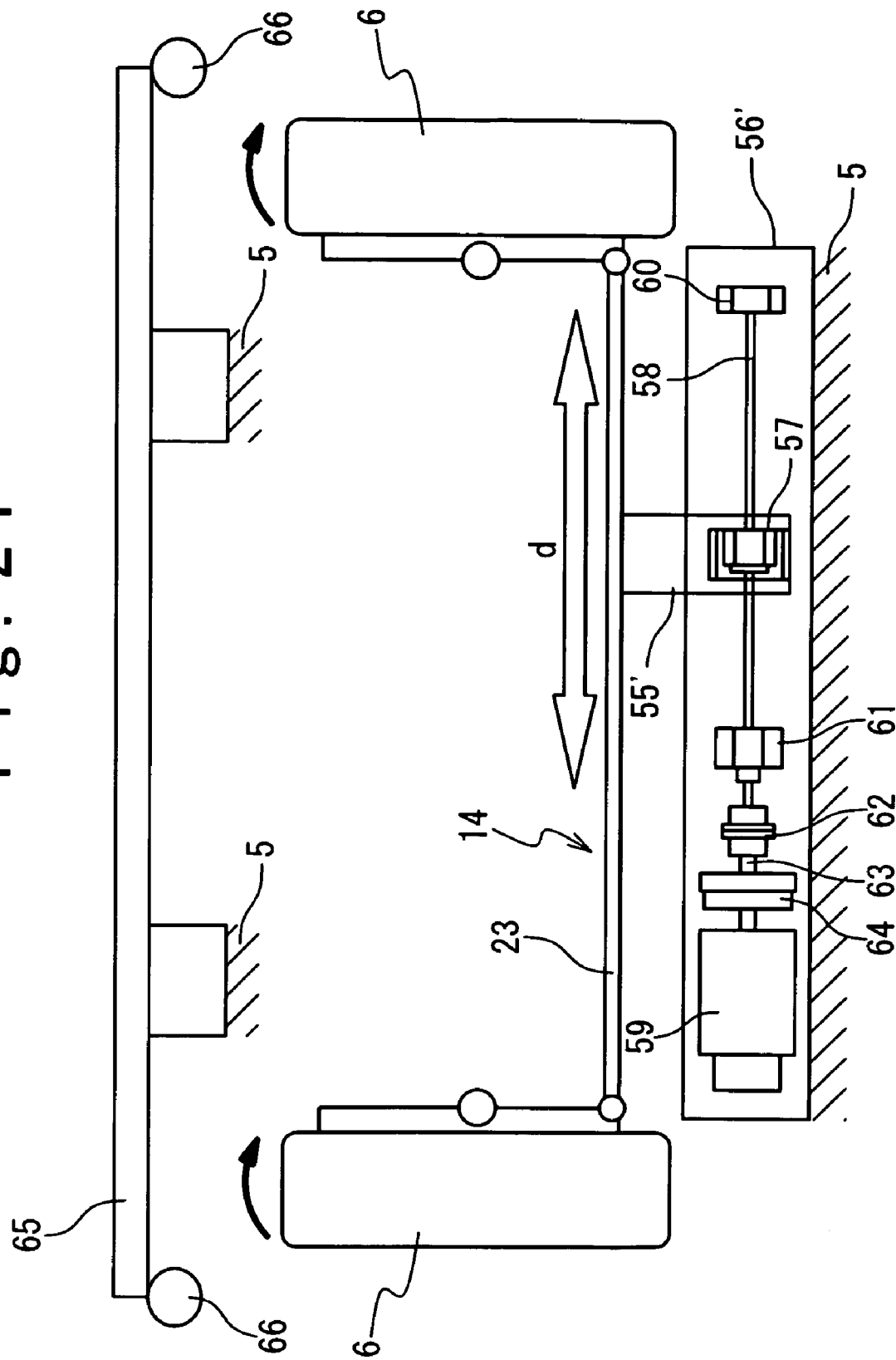
FIG. 21 is a sectional view showing the drive section in the rail non-contact vehicle according to a ninth embodiment of the present invention.

Referring to FIG. 21, the drive section 21 of the steering system used for the steering apparatus of the rail non-contact vehicle according to the ninth embodiment of the present invention will be described. Referring to FIG. 21, this embodiment differs to the embodiment of FIG. 19 in that the safety bar 65 is directly fixed to the cart 5 without the first link mechanism 13. The clutch 64 is disengaged at the time of abnormalities, and the vehicle 3 is directly guided by the safe rings 66 of the safety bar 65 of the right and left sides. In this case, the nut 57 which non-resistively and freely moves in a transverse direction d to the ball screw 58 does not behave as an obstacle for steering.

The safety bar for guiding the vehicle 3 is actually not required since the vehicle main body itself has a function of the safety bar. An abnormal torque occurs in the servomotor 61 when the vehicle main body contacts the curbstone 43, and a control signal expressing a control steering angle is sent normally to the servomotor 61. Detection of the abnormal torque stops the further movement of the vehicle and actuates the braking of the wheel 6 to prevent accident. However, it is preferable to equip the safety bar and the curbstone 43 as a precaution.

Referring to FIG. 22, the drive section 20 of the steering system used for the steering apparatus of the rail non-contact vehicle according to the tenth embodiment of the present invention will be described. Referring to FIG. 20, this embodiment realizes the above-mentioned real time high precision route control and the safety associated with the control. The feature is achieved by using a fluid pressure drive mechanism and the safety bar. In this embodiment, the fluid pressure drive mechanism is used instead of the drive section 20 in the seventh embodiment of FIG. 18 which uses the screw axis. A fluid pressure supply source (not shown) is used instead of the motor 59, and a piston rod 57' is used instead of a pair of the nut 57 and the ball screw 58. The pressured fluid supplied to the inside of a fluid pressure cylinder 71 acts on movable end of the piston rod 57' on one side, and the movable end of the piston rod 57' on the other side is fixed to the actuator fixed section 55 which is fixedly supported by the cart 5.

A steering mechanism supplies positive pressure or negative pressure to the operation chamber 72 of the fluid pressure cylinder 71, drives the safety bar 65 in right and left directions to the actuator fixed section 55, and actuates the first link mechanism 13 and the second link mechanism 14 via the safety bar 65. Thus, the control of the steering mechanism is similar to the control of the seventh embodiment of FIG. 18 in a point that the turn direction of the wheels is controlled via movement of the safety bar 65. The safety bar 65 moves in right and left directions when the positive and negative pressure oil is supplied to the operation chamber of the fluid pressure cylinder 71. It would be theoretically possible that when the safety bar 65 receives external force from the outside of the vehicle, the external force and the supply capability of the oil pressure to the fluid pressure cylinder 71 interfere with each other. In this case, the steering control of the control section 10 is inactivated and the auxiliary mechanical control by the safety bar 65, the first link mechanism 13, and the second link mechanism 14 is carried out with a priority. The momentary interference at the time of switching of the control is eased by viscosity and compressibility of fluid of the fluid pressure cylinder. In a next instant, an open valve interposed in piping of the fluid pressure control mechanism opens, and safety is thoroughly maintained. Due to such a buffer mechanism, this embodiment excels in safety than the seventh embodiment of FIG. 18. In order to strengthen the buffer, air pressure is preferable as the fluid pressure, and water is preferable as the fluid concerning environment.

The ball screw 58 of FIG. 19 may be replaced by the piston rod 57' of FIG. 18. The ball screw 58 of FIG. 21 may be replaced by the piston rod 57' of FIG. 18. The actuator movable section 56 and the actuator fixed section 55 of FIG. 22 are exchangeable in position. The actuator movable section 56 may be fixed to the cart 5, and the actuator fixed section 55 to the safety bar 65.

The invention claimed is:

1. A vehicle guided along a running route without contact with a guide rail, comprising:

wheels;

a cart supported by said wheels;

a vehicle main body supported by said cart; and a steering control system which comprises a control section and a drive section, and wherein said control section generates a provisional steering angle based on a current target deviation from a running route at a current position of said vehicle, a current actual deviation from said running route at said current position of said vehicle, and a current target steering angle at said current position of said vehicle, said control section comprises:

an optimization calculating section configured to convert said provisional target steering angle to a target control steering angle by adding a correction steering angle based on a steering angle prediction correction to minimize vibration of said vehicle resulting from a steering of said vehicle, and said drive section mechanically steers said cart based on said target control steering angle.

2. The vehicle guided along a running route without contact with a guide rail according to claim 1, wherein said control section comprises:

a first detector configured to detect said current actual deviation;

a deviation holding section configured to hold said current target deviation;

a steering angle holding section configured to hold said current target steering angle;

a control calculating section configured to generate said provisional steering angle based on said current target deviation, said current actual deviation and said current target steering angle; and said optimization calculating section.

3. The vehicle guided along a running route without contact with a guide rail according to claim 2, wherein said running route is set on a road surface, and said deviation holding section comprises a second detector configured to detect said current target deviation from said running route in a non-contact manner.

4. The vehicle guided along a running route without contact with a guide rail according to claim 2, wherein said deviation holding section comprises:

a position calculating section provided on said vehicle main body, and configured to determine said current position of said vehicle by integrating a velocity data of said vehicle and to determine said current target deviation based on said current position of said vehicle.

5. The vehicle guided along a running route without contact with a guide rail according to claim 4, wherein said control section further comprises:

a velocity detector configured to detect a velocity of said vehicle.

6. The vehicle guided along a running route without contact with a guide rail according to claim 2, wherein said running route is set on a road surface and comprises an output section configured to output said current position without contact, and said control section comprises a receiver configured to receive said current position from said output section.

7. The vehicle guided along a running route without contact with a guide rail according to claim 6, wherein said target steering angle is written in said running route, and said receiver receives said target steering angle from said output section.

8. The vehicle guided along a running route without contact with a guide rail according to claim 2, wherein said optimization calculating section comprises:

a steering angle correction generating section configured to determine a current optimal steering angle at said current position of said vehicle and a future optimal steering angle corresponding to a future position of said vehicle based on said current steering angle, and to generate a correction steering angle based on a difference between said target deviation and said current actual deviation, said current optimal steering angle, and said future optimal steering angle; and a correction adding section configured to generate said control steering angle by adding said provisional steering angle, and said correction steering angle.

9. The vehicle guided along a running route without contact with a guide rail according to claim 8, wherein said optimization calculating section further comprises:

a current steering angle detector configured to detect said current steering angle corresponding to said current position; and an optimal solution calculating section configured to determine said current optimal steering angle and said future optimal steering angle from all or a part of said current steering angles for N times when said vehicle ran said running route N times, and said optimal solution calculating section determines said current optimal steering angle and said future optimal steering angle such that the vibration resulting from the steering of said vehicle is minimized.

10. The vehicle guided along a running route without contact with a guide rail according to claim 9, wherein said optimal solution calculating section comprises a neural network configured to determine said correction steering angle from said difference between said current target deviation and said current actual deviation and said current steering angle.

11. The vehicle guided along a running route without contact with a guide rail according to claim 9, wherein said optimal solution calculating section executes a program to determine said correction steering angle based on genetic algorithm.

12. The vehicle guided along a running route without contact with a guide rail according to claim 10, wherein said optimal solution calculating section executes a program to determine said correction steering angle based on genetic algorithm.

13. The vehicle guided along a running route without contact with a guide rail according to claim 2, wherein said deviation holding section comprises a position detector configured to detect said current position of said vehicle.

14. The vehicle guided along a running route without contact with a guide rail according to claim 13, wherein said optimization calculating section determines said correction steering angle such that a sum of squares of the accelerations in m times running on said running route is minimized.

15. The vehicle guided along a running route without contact with a guide rail according to claim 1, wherein when a difference between said current position of said vehicle in a m-th run of said running route and said current position of said vehicle in an n-th run of said running route is given as an amplitude, said optimization calculating section determines said correction steering angle such that a sum of squares of the amplitudes for optional combinations of m and n is minimized.

16. The vehicle guided along a running route without contact with a guide rail according to claim 1, further comprising:

a safety bar supported by said cart, said drive section is interposed between said cart and said wheels, and a displacement portion of said drive section is mechanically connected with said wheels and said safety bar.

17. The vehicle guided along a running route without contact with a guide rail according to claim 16, wherein said displacement portion is a ball screw driven by a motor or a nut connected to said ball screw.

18. The vehicle guided along a running route without contact with a guide rail according to claim 16, wherein said displacement portion is a cylinder driven with a fluid pressure source or a piston rod connected to said cylinder.

19. A vehicle guided along a running route without contact with a guide rail, comprising:
  wheels;
  a cart supported by said wheels; and
  a steering apparatus which comprises a control section and a drive section, and
  wherein said control section generates a provisional steering angle based on a current target deviation from a running route at a current position of said vehicle, a current actual deviation from said running route at said current position of said vehicle, and a current target steering angle at said current position of said vehicle, and optimize said provisional target steering angle to a control steering angle to minimize vibration of said vehicle resulting from a steering of said vehicle, and
  said drive section mechanically steers said cart based on said target control steering angle,
  said drive section comprises:
  a motor;
  a screw axis connected with an output axis of said motor;
  bearings configured to support said screw axis;
  a nut screwed with said screw axis;
  a first support configured to support said nut;
  a second support configured to support said bearings; and
  a link mechanism configured to steer said wheels, and
  either of said first support and said second support constitutes a fixation side support fixed to said cart, and either of said first support and said second support constitutes a movable side support connected with said link mechanism.

20. The vehicle guided along a running route without contact with a guide rail according to claim 19, further comprising:
  a safety bar; and
  safe rings supported by the safety bar, and
  said safety bar is connected with said movable side support,
  said cart is connected with said fixation side support, and
  said nut is supported by the cart.

21. The vehicle guided along a running route without contact with a guide rail according to claim 20, wherein said motor and said bearings are supported by said safety bar.

22. The vehicle guided along a running route without contact with a guide rail according to claim 20, wherein said steering apparatus further comprises:
  a clutch interposed between said screw axis and said motor, and
  connection of said clutch is released in response to contact of said safe rings and said rail side fixed object.

23. The vehicle guided along a running route without contact with a guide rail according to claim 20, wherein said nut is supported by said link mechanism, and said motor and said bearings are supported by said cart.

24. The vehicle guided along a running route without contact with a guide rail according to claim 20, wherein said screw axis constitutes a ball screw axis.

25. A vehicle guided along a running route without contact with a guide rail, comprising:
  wheels;
  a cart supported by said wheels, and
  a steering unit which comprises a control section and a drive section, and
  wherein said control section generates a provisional steering angle based on a current target deviation from a running route at a current position of said vehicle, a current actual deviation from said running route at said current position of said vehicle, and a current target steering angle at said current position of said vehicle, and optimize said provisional target steering angle to a control steering angle to minimize vibration of said vehicle resulting from a steering of said vehicle, and
  said drive section mechanically steers said cart based on said target control steering angle,
  said drive section comprises:
  a motor;
  a movable body connected with an output axis of said motor;
  a safety bar provided with safe rings, and
  a link mechanism configured to steer said wheels,
  said link mechanism is connected with said safety bar and said movable body, and
  said safety bar is movably supported to said cart, and said motor is fixedly supported by said cart.

26. The vehicle guided along a running route without contact with a guide rail according to claim 25, wherein said output axis of said motor is connected with a movable body via a pinion and a rack.

27. A vehicle guided along a running route without contact with a guide rail, comprising:
  wheels;
  a cart supported by said wheels; and
  a steering unit which comprises a control section and a drive section, and
  wherein said control section generates a provisional steering angle based on a current target deviation from a running route at a current position of said vehicle, a current actual deviation from said running route at said current position of said vehicle, and a current target steering angle at said current position of said vehicle, and optimize said provisional target steering angle to a control steering angle to minimize vibration of said vehicle resulting from a steering of said vehicle, and
  said drive section mechanically steers said cart based on said target control steering angle,
  said drive section comprises:
  a motor;
  a screw axis connected with an output axis of said motor;
  bearings configured to support said screw axis;
  a nut screwed in said screw axis;
  a link mechanism configured to steer said wheels; and
  a safety bar provided with safe rings,
  said safety bar, said motor, and said bearings are fixedly supported by said cart, and
  said nut is connected with said link mechanism.

28. The vehicle guided along a running route without contact with a guide rail according to claim 27, wherein said steering unit further comprises:
  a clutch interposed between said screw axis and said motor, and
  connection of said clutch is released in response to a contact of said safe rings and said rail side fixed object.

29. A method of steering a vehicle guided along a running route without contact with a guide rail, comprising:
  setting of a 1-dimensional coordinate data of a target route, the 1-dimensional coordinate data comprising a sequence of position data of the target route;
  setting of a target steering angle corresponding only to said 1-dimensional coordinate data $[X_j]$,
  detecting a current deviation between said target routes and a current position of a vehicle main body;
  generating a control steering angle corresponding to said current deviation and said target steering angle; and
  turning orientation of wheels to an angle position corresponding to said control steering angle, and wherein said current deviation is defined as a distance of said current position in a direction orthogonal to said target route.

30. The steering method according to claim 29, further comprising:

setting a future target steering corresponding to a future position on said target route; and generating a correction steering angle corresponding to the future steering angle, and wherein said control steering angle is determined based on said current deviation, said target steering angle, and said correction steering angle.

* * * * *

(12) SUPPLEMENTAL EXAMINATION CERTIFICATE

United States Patent  (10) Number:  US 7,757,608 F1
Kono et al.  (45) Certificate Issued:  Jan. 22, 2014

Control No.: 96/000,028  Filing Date: Oct. 23, 2013
Primary Examiner: Peter C. English No substantial new question of patentability is raised in the request for supplemental examination. See the Reasons for Substantial New Question of Patentability Determination in the file of this proceeding.

(56) Items of Information

FOREIGN PATENT DOCUMENTS

| | | | |
|---|---|---|---|
| JP | 05-184178 A | 07-23-1993 | Sudo et al. |
| JP | 06-119034 A | 04-28-1994 | Watanabe |
| JP | 08-137549 A | 05-31-1996 | Okawa |
| JP | 08-150949 A | 06-11-1996 | Nagaoka et al. |
| JP | 08-272442 A | 10-18-1996 | Ota |
| JP | 10-320051 A | 04-12-1998 | Okada |
| JP | 2000-056828 A | 02-25-2000 | Hori |
| JP | 2000-121357 A | 04-28-2000 | Hasumi et al. |
| JP | 2000-264196 A | 09-26-2000 | Mio et al. |
| JP | 2001-146152 A | 05-29-2001 | Soga et al. |
| JP | 2001-265436 A | 09-28-2001 | Aso et al. |
| JP | 2002-123315 A | 04-26-2002 | Ando |